US012769747B2

(12) United States Patent
Azarmi

(10) Patent No.: US 12,769,747 B2
(45) Date of Patent: Oct. 20, 2026

(54) CONTEXT FOR LANGUAGE MODELS

(71) Applicant: Elasticsearch B.V., Amsterdam (NL)

(72) Inventor: Bahaaldine Azarmi, Danville, CA (US)

(73) Assignee: Elasticsearch B. V., Amsterdam (NL)

( * ) Notice: Subject to any disclaimer, the term of this patent is extended or adjusted under 35 U.S.C. 154(b) by 0 days.

(21) Appl. No.: 18/828,733

(22) Filed: Sep. 9, 2024

(65) Prior Publication Data

US 2025/0086190 A1 Mar. 13, 2025

Related U.S. Application Data

(60) Provisional application No. 63/581,195, filed on Sep. 7, 2023.

(51) Int. Cl.
*G06F 17/00* (2019.01)
*G06F 7/00* (2006.01)
*G06F 16/2457* (2019.01)

(52) U.S. Cl.
CPC .............................. *G06F 16/24578* (2019.01)

(58) Field of Classification Search
CPC ................................................ G06F 16/24578
USPC ........................................................ 707/728
See application file for complete search history.

(56) References Cited

U.S. PATENT DOCUMENTS 9,224,396 B2 * 12/2015 Lu .......................... G06F 3/167
10,127,224 B2 * 11/2018 Deleeuw ........... G06F 16/90332
10,824,679 B2 * 11/2020 Zhang ................... G06F 40/284
11,516,158 B1 * 11/2022 Luzhnica ................ G06F 40/30
11,928,438 B1 * 3/2024 Das ......................... G06F 21/64
11,962,546 B1 * 4/2024 Hattangady .......... G06N 3/0475
12,001,462 B1 * 6/2024 Madisetti ............ G06F 16/3329
2016/0179937 A1 * 6/2016 Allen ................. G06F 16/3329 707/728
2022/0222260 A1 * 7/2022 Lin ........................ G06N 20/00
2022/0383125 A1 * 12/2022 Kewalramani ........ G06N 3/047
2022/0391453 A1 * 12/2022 Kewalramani ...... G06N 3/0442
2023/0100716 A1 * 3/2023 Singh .................... G06F 11/079 714/48
2023/0186319 A1 * 6/2023 Nguyen .................. G06F 40/47 704/9
2023/0196018 A1 * 6/2023 Rozen ..................... G06F 40/30 704/9
2023/0244678 A1 * 8/2023 Hill ..................... G06F 16/3329 707/748
2024/0111498 A1 * 4/2024 Vaughn ..................... G06F 8/30
2024/0220727 A1 * 7/2024 Yuan .................. G06F 18/2413

(Continued)

*Primary Examiner* — Pavan Mamillapalli
(74) *Attorney, Agent, or Firm* — Brake Hughes Bellermann LLP

(57) ABSTRACT

A system may retrieve, from a context datastore, context data that is responsive to a user prompt, and transmit an augmented prompt to a language model, the augmented prompt including the user prompt and the context data. A system may receive a model response with textual data that responds to the user prompt. A system may compute a plurality of attribute scores about the context data based on at least one of the context data or the model response. A system may compute a significance of context value about an effectiveness of the context data for generating the model response based on the plurality of attribute scores. A system may execute a computer action in response to the significance of context value not satisfying a threshold level.

21 Claims, 11 Drawing Sheets

(56) References Cited

U.S. PATENT DOCUMENTS

| | | | | |
|---|---|---|---|---|
| 2024/0249077 | A1* | 7/2024 | Chen | G06F 40/284 |
| 2024/0320476 | A1* | 9/2024 | Chandrasekaran | G06N 20/00 |

* cited by examiner

CONTEXT FOR LANGUAGE MODELS

CROSS REFERENCE TO RELATED APPLICATIONS

This application claims priority to U.S. provisional application No. 63/581,195, filed Sep. 7, 2023, the content of which are incorporated herein by reference in its entirety.

BACKGROUND

Context data may affect the quality of responses generated by language models. For some systems that use context data for generating model responses, measuring the effectiveness of context data for generating model responses may pose one or more technical challenges, which may cause implementing solutions to increase the effectiveness of context data relatively difficult.

SUMMARY

The disclosure discussed herein provides a system that receives or computes one or more scores that represent various attributes of context data that is used to generate a model response by a language model. The system may receive or compute a relevance score, a timeliness score, a continuity score, and/or an accuracy score related to the use of context data for generating a model response. The system computes a significance of context (SoC) value based on the relevance score, the timeliness score, the continuity score, and the accuracy score. The system uses the SoC value and/or the scores that are used to compute the SoC value to implement one or more computer actions to increase the SoC value, thereby increasing the quality of responses delivered by a language model. Furthermore, the techniques discussed herein may reduce the amount of computer sources (e.g., processing power, memory) to generate a model response by reducing the number of user prompts that otherwise the user may have to submit to receive a quality, accurate response.

In some aspects, the techniques described herein relate to a method including: retrieving, from a context datastore, context data that is responsive to a user prompt; transmitting an augmented prompt to a language model, the augmented prompt including the user prompt and the context data; receiving, from the language model, a model response with textual data that responds to the user prompt, the textual data being generated by the language model using the context data; computing a plurality of attribute scores about the context data based on at least one of the context data or the model response; computing a significance of context value about an effectiveness of the context data for generating the model response based on the plurality of attribute scores; and executing a computer action in response to the significance of context value not satisfying a threshold level.

In some aspects, the techniques described herein relate to an apparatus including: at least one processor; and a non-transitory computer-readable medium storing executable instructions that when executed by the at least one processor cause the at least one processor to execute operations, the operations including: retrieving, from a context datastore, context data that is responsive to a user prompt; transmitting an augmented prompt to a language model, the augmented prompt including the user prompt and the context data; receiving, from the language model, a model response with textual data that responds to the user prompt, the textual data being generated by the language model using the context data; computing a plurality of attribute scores about the context data based on at least one of the context data or the model response, the plurality of attribute scores including two or more of a relevance score, a timeliness score, a continuity score, or a accuracy score; computing a significance of context value about an effectiveness of the context data for generating the model response based on the plurality of attribute scores; and executing a computer action in response to the significance of context value not satisfying a threshold level.

In some aspects, the techniques described herein relate to a non-transitory computer-readable medium storing executable instructions that cause at least one processor to execute operations, the operations including: retrieving, from a context datastore, context data that is responsive to a user prompt; transmitting an augmented prompt to a language model, the augmented prompt including the user prompt and the context data; receiving, from the language model, a model response with textual data that responds to the user prompt, the textual data being generated by the language model using the context data; computing a plurality of attribute scores about the context data based on at least one of the context data or the model response; computing a significance of context value about an effectiveness of the context data for generating the model response based on the plurality of attribute scores; and executing a computer action in response to the significance of context value not satisfying a threshold level.

The details of one or more implementations are set forth in the accompanying drawings and the description below. Other features will be apparent from the description and drawings, and from the claims.

DETAILED DESCRIPTION

Figure 1A:
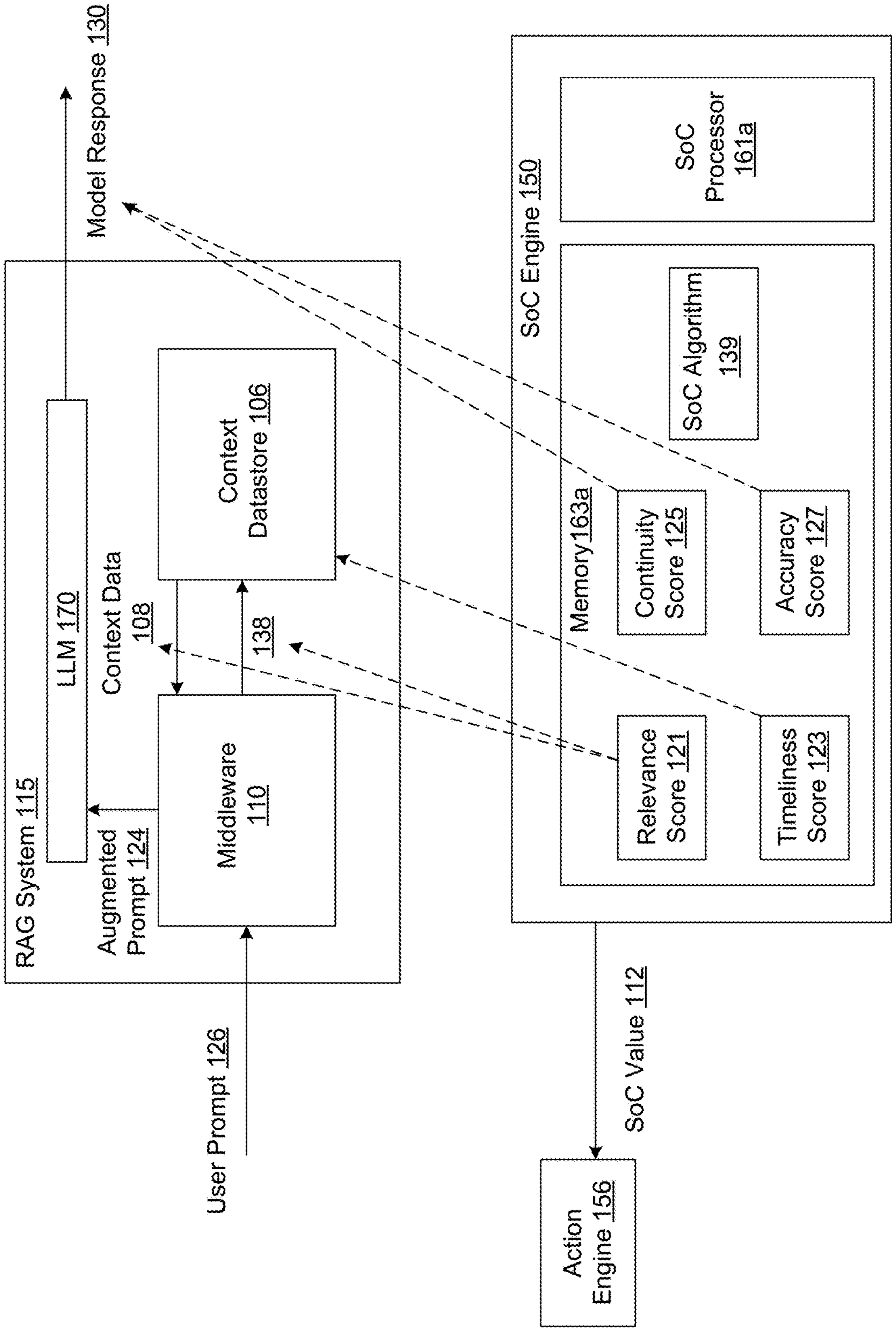
FIG. 1A illustrates a retrieval augmented generation system with a significance of context engine according to an aspect.

The disclosure discussed herein provides a system that implements a technical solution for computing an overall effectiveness value (e.g., a significance of context (SoC) value) of context data that is used in a retrieval augmented generation (RAG) system for generating model responses by one or more language models and for executing one or more computer actions based on the overall effectiveness value and/or one or more attribute scores (e.g., a relevance score, a timeliness score, a continuity score, and/or an accuracy score) that are used to compute the overall effectiveness value to increase the overall effectiveness score, thereby increasing the quality of model responses generated by a language model.

For example, in an RAG system, a user may submit a user query to a language model. In some examples, the user query may be referred to as a prompt or an initial prompt. The RAG system includes a context retrieval engine that retrieves context data from a context datastore by using the user query to search for responsive data in the context datastore. The RAG system includes a prompt manager that generates an augmented prompt, where the augmented prompt includes the user query, and the context data retrieved from the context datastore. The prompt manager transmits the augmented prompt to a language model, which returns a model response with textual data that responses to the user query. In some examples, the quality of the context data may be correlated with the quality of the model response.

According to the techniques discussed herein, the RAG system includes a SoC engine that computes or receives a relevance score, a timeliness score, a continuity score, and/or an accuracy score. A relevance score is a value that represents a level of semantic similarity between the user query and the retrieved context data. A timeliness score may represent a level of freshness of the retrieved context data (e.g., data with an older timestamp may have a lower timeliness score). A continuity score may represent a level of logical consistency (e.g., a higher score indicates a seamless flow of information). An accuracy score may represent a level of reliability or truthfulness of data. The SoC engine includes an algorithm that computes the SoC value based on the relevance score, the timeliness score, the continuity score, and/or the accuracy score. In some examples, the algorithm is a weighted algorithm that applies weights to the relevance score, the timeliness score, the continuity score, and/or the accuracy score. In some examples, the algorithm includes a sigmoid function. In some examples, the SoC value may be a value between a first value and a second value. In some examples, the first value is zero. In some examples, the second is zero.

FIGS. 1A through 1D illustrate a system 100 that implements a retrieval augmented generation (RAG) system 115 that receives a user prompt 126 received via a user interface 175, generates a query 138 based on the user prompt 126, retrieves context data 108 from a context datastore 106 using the query 138, and transmits an augmented prompt 124 with the context data 108 and the user prompt 126 to a large language model (LLM) 170 to generate a model response 130. In some examples, the LLM 170 is referred to as a language model or a generative machine-learning model. The RAG system 115 implements a technical solution that can measure the effectiveness of the context data 108 that is used to generate the model response 130 and execute one or more computer actions to increase the effectiveness of the context data 108, thereby increasing the quality of the model response 130.

The system 100 is configured to communicate with an LLM 170 to generate a model response 130 with textual data 132 that responds to a user prompt 126 using context data 108 (e.g., responsive document(s) or portion(s) thereof). For example, an organization may use the system 100 to store a plurality of documents 104 in a database 102 on a server computer 160. In some examples, the database 102 is referred to as a context datastore 106. The database 102 may be associated with an organization. In some examples, the database 102 stores documents 104 received from one or more computing devices 152 associated with the organization. The system 100 includes a RAG system 115 configured to operate with an application 166 (e.g., a chat application 168) to enable retrieval of context data 108 from a database 102 that satisfies a query 138 and to initiate generation of an answer (e.g., a model response 130 with textual data 132) by an LLM 170 that responds to the user prompt 126.

The system 100 may include an ingestion engine 116 configured to receive, index, and store documents 104 in the database 102. The documents 104 may include private documents, e.g., documents that are only accessible by authorized users of the database 102. The documents 104 may include public documents, e.g., documents that are accessible by the general public. The documents 104 may include private and public documents. In some examples, the documents 104 are organizational documents of an organization associated with the database 102. The LLM 170 may be a predefined LLM that was configured (e.g., trained) using publicly available information. In some examples, the LLM 170 is not initially trained to answer questions about information found in the documents 104 stored on the database 102. However, the system 100 discussed herein enables the LLM 170 to formulate model responses 130 to queries about content included in responsive documents, where the responsive documents include information that may not have been used to configure (e.g., train) the LLM 170.

During data ingestion, the ingestion engine 116 may persist data to storage (e.g., the database 102), where the data may include documents 104 and/or index structures 155. The database 102 may be stored on the server computer 160. The database 102 may include internal company documents from an internal knowledge base, technical documents, issues, or code from a version control system such as GitHub, structured data from an external database, sales organization data from a customer relationship database, and/or proprietary documents from an online storage system.

The ingestion engine 116 may receive documents 104 to be stored, managed, and searched by the system 100. A document 104 may be an instance of digital data. The documents 104 may cover a wide variety of information such as files, text documents, web documents, web pages, PDFs, files and/or records. The documents 104 may be associated with a wide variety of file formats. The documents 104 may also cover images and/or video files. The ingestion engine 116 may include one or more indexing engines configured to index the documents 104 received via one or more computing devices 152. The ingestion engine 116 may include a distributed computing system with a plurality of nodes (e.g., which may also be referred to indexing nodes). The ingestion engine 116 may receive (e.g., ingest) data (e.g., documents 104) from one or more computing devices 152. The ingestion engine 116 may generate one or more index structures 155 about the documents 104.

In some examples, the database 102 is a vector database. A vector database is a database configured to store and retrieve information represented as vectors. A vector may be a series of numerical values or a multi-dimensional array that represent characteristics or features of a piece of data. Unlike traditional databases that store data in tables with rows and columns, a vector database stores data points as vectors (e.g., high-dimensional vectors). Each dimension may represent a specific feature or attribute of the data. For example, a text document might be represented as a vector where each element reflects the weight or importance of a specific word within the document. In some examples, the vector database (or the context datastore 106) may function as a memory device (e.g., a long-term memory) and/or a semantic knowledge store for an LLM 170.

An index structure 155 may be a data structure that includes information about the documents 104 that have been indexed. In some examples, the index structure 155 includes metadata (e.g., cluster metadata, metadata structure, file metadata, etc.). In some examples, an index structure 155 is referred to as an index, a Lucene index (e.g., Lucene files) or segments (e.g., Lucene segments) or a stateless compound commit file. In some examples, an index structure 155 is referred to as an index file. In some examples, an index structure 155 is referred to as an index. The index structure 155 may be used by a context retrieval engine 118 (or the middleware engine 110) to efficiently find context data 108 (e.g., responsive document(s) or portion(s) thereof) that is relevant to a particular query 138. The type of index structure 155 is dependent upon the type of documents 104 ingested by the ingestion engine 116, but may generally include a document identifier, document type, timestamp, index terms, ranking, etc.

Figure 1B:
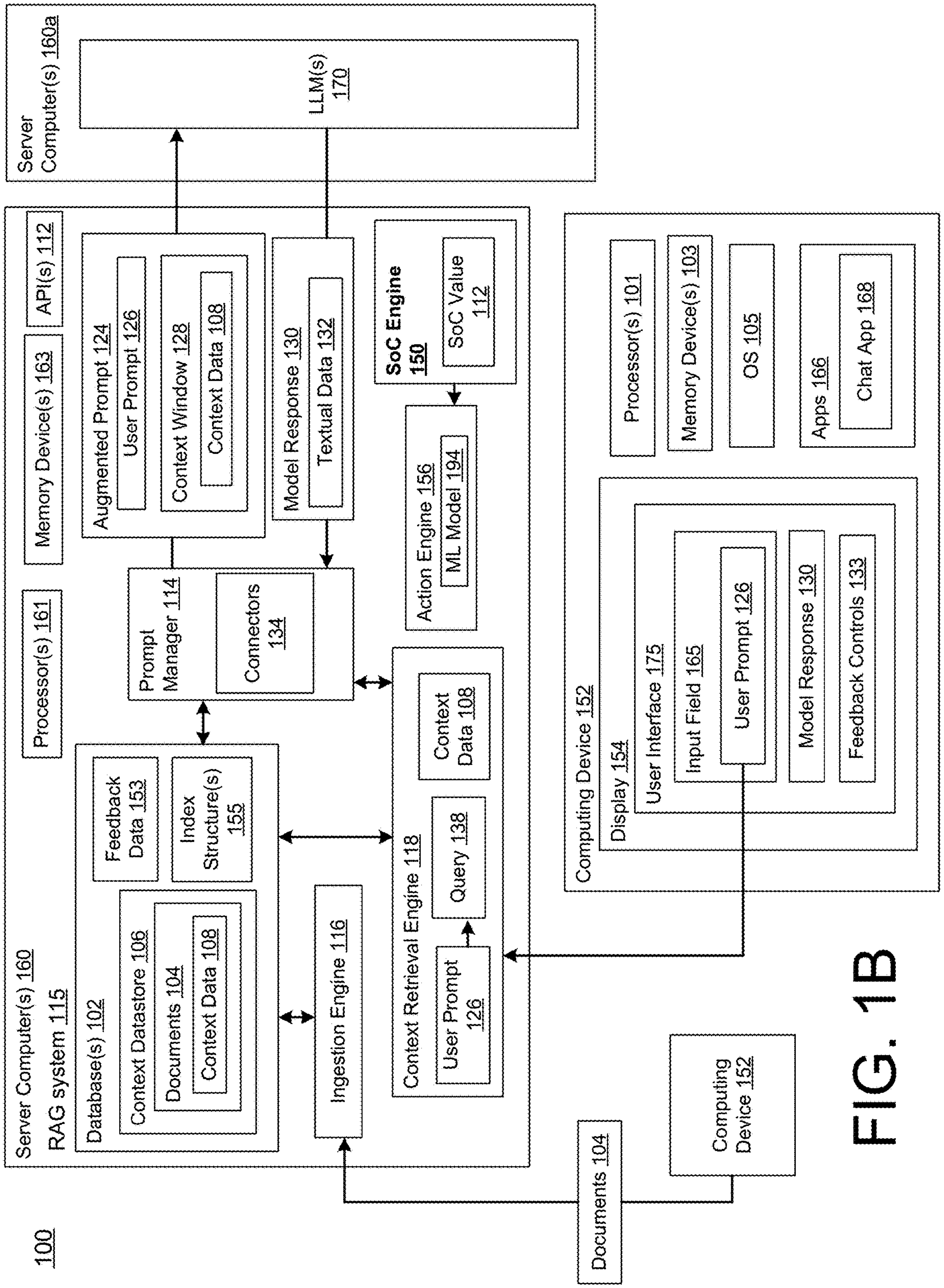
FIG. 1B illustrates an example of a more detailed view of the retrieval augmented generation system according to an aspect.

As shown in FIGS. 1A and 1B, the RAG system 11 includes a middleware engine 110 configured to receive the user prompt 126 via an input field 165 of a user interface 175 displayed on a display 154 of a computing device 152. For example, a user may enter the user prompt 126 into the input field 165 by typing or voice command. The user prompt 126 may be a natural language description entered by the user. In some examples, the user interface 175 is an interface of a chat application 168 configured to enable the user to communicate with an LLM 170. The middleware engine 110 may communicate with the context datastore 106 to retrieve context data 108 that is responsive to a query 138 and may communicate with an LLM 170 to transmit an augmented prompt 124.

The middleware engine 110 may be one or more components between the user interface 175 and the LLM 170. In some examples, as shown in FIG. 1B, the middleware engine 110 may include a context retrieval engine 118 and a prompt manager 114. The middleware engine 110, in the RAG system 115, can function as an orchestrator for transaction components. In some examples, the middleware engine 110 can be configured to ensure seamless data integration and real-time responsiveness, preserving consistency across diverse interactions. In some examples, the middleware engine 110 can also facilitate communication, scalability, and modularity without disrupting existing operations.

As shown in FIG. 1B, the context retrieval engine 118 may receive the user prompt 126 from the application 166. In some examples, the context retrieval engine 118 may include a distributed computing system with a plurality of search nodes (e.g., which may also be referred to as nodes). The context retrieval engine 118 generates a query 138 based on the user prompt 126. In some examples, the query 138 includes the user prompt 126. In some examples, the query 138 is or includes the language of the user prompt 126. In other words, in some examples, the user prompt 126 may be replaced with query 138 (and vice versa). In some examples, the context retrieval engine 118 may generate the query 138 by modifying the user prompt 126 to include one or more terms that are specific to a domain of the context datastore 106. In some examples, the query 138 includes a vectorized format of the user prompt 126.

The context retrieval engine 118 retrieves context data 108 from the context datastore 106 that satisfies the query 138. In some examples, instances of the term "context data" may be replaced with "responsive data", "responsive documents", "organizational data", "search results", or "retrieved content." The context data 108 may be a portion or a subset of documents 104 that is stored at the context datastore 106 that is responsive to the terms of the query 138. The context data 108, responsive to the query 138, may be one or more sentences, one or more paragraphs, or one or more documents that are semantically related to the query 138. The context retrieval engine 118 may search the index structure(s) 155 for context data 108 that is responsive to the query 138. The query 138 includes one or more search terms that are used to locate responsive document(s) or portion(s) thereof that are stored in the database 102.

In some examples, the context retrieval engine 118 may rank the search results returned as the context data 108. In some examples, each search result may have a corresponding relevance value (or relevance score 121) that represents a level of similarity to the query 138. In some examples, the context retrieval engine 118 may rank the search results based on the relevance value. In some examples, ranking may include applying a plurality of ranking signals to the search results. The ranking signals may include signals relating to quality, uniqueness of content, user experience, social signals (e.g., popularity), relevance, authoritative, the use of keywords, and/or freshness of content.

In some examples, the query 138 includes a query vector, and the context datastore 106 is a vector database. In some examples, in response to the query 138, the context retrieval engine 118 executes a vector search to find semantically similar data portions (e.g., sentences, paragraphs, or documents) in the context datastore 106. In some examples, the context retrieval engine 118 may generate a query vector (e.g., the query 138) using the textual data of the user prompt 126 and identify data points with vector representations closest to the query vector.

The context retrieval engine 118 may use one or more search strategies to locate context data 108 that is semantically related to the query 138. The search strategies may include a vector database search, a natural language processing (NLP) enrichment search, a late interaction model search, and/or a regular token matching search. In some examples, the context retrieval engine 118 uses a hybrid search that uses a combination of two or more of the following search strategies: a vector database search, an NLP enrichment search, a late interaction model search, and/or a regular token matching search. With respect to a vector database search, a vector database (e.g., the context datastore 106) may store numeric representation of documents that capture the context and meaning of those documents, including text, images and audio. The numeric representation, called vectors, may be obtained using a pre-trained machine learning (ML) model. A vector database search may find the vectors (documents) that are the closest (in the vector space) to the vector representation of the query 138. This may be used to implement semantic search, e.g., find text data that is the closest semantically, or find similar images. A regular token matching search may be a technique where the search algorithm matches user queries against tokens within a dataset, and these tokens can be words or phrases.

The prompt manager 114 generates an augmented prompt 124 with the user prompt 126 and a context window 128. The context window 128 includes the context data 108 retrieved by the context retrieval engine 118. In some examples, the context data 108 included in the augmented prompt 124 is in the vector format (e.g., numerical representation of the underlying data). In some examples, the user prompt 126 included in the augmented prompt 124 is in the vector format (e.g., vector query). In some examples, the prompt manager 114 uses an embedding model to convert the context data 108 in the vector format (e.g., retrieved from a vector database) to a text-based format. In other words, the prompt manager 114 may convert the responsive vector(s) to textual data and include the textual data in the augmented prompt 124. In some examples, the user prompt 126 included in the augmented prompt 124 is in a textual format. In some examples, the context window 128 includes one or more system prompts. A system prompt may be pre-configured textual data that directs the LLM 170 to generate responses.

In some examples, the context window 128 also includes conversation history data relating to a chat history between the user and the LLM 170 for a particular chat session. In other words, the conversation history data may be the model responses 130 and the user prompts 126 for a particular chat session. In some examples, the context window 128 also includes personalization data about the user that submitted the user prompt 126. The personalization data may be obtained from a user profile stored in the database 102, where the user profile includes information about the user.

The prompt manager 114 may communicate with the LLM 170 by providing the augmented prompt 124 as an input to the LLM 170. In some examples, the prompt manager 114 may communicate with the LLM 170 via one or more application programming interfaces (APIs) 112. The LLM 170 uses the context window 128 for formulating a model response 130 with textual data 132 that answers the user prompt 126 from the context data 108 (and, in some examples, other information included in the context window 128). The textual data 132 may be generative artificial intelligence (AI) content. The RAG system 115 may initiate display of the model response 130 on the user interface 175. Initiating display of the model response 130 may include transmitting information to the computing device 152 that causes the computing device 152 to display the model response 130 in the user interface 175. Initiating display of the model response 130 may include transmitting information to an application 166 (e.g., the chat application 168) that causes the application 166 to display the model response 130 in the user interface 175.

As shown in FIGS. 1A and 1B, the RAG system 115 includes a significance of context (SoC) engine 150 configured to compute one or more attribute scores that represent one or more attributes of the context data 108 that are used to generate the model response 130. For example, the SoC engine 150 receives or computes a relevance score 121, a timeliness score 123, a continuity score 125, and/or an accuracy score 127. In some examples, each of the attribute scores are a value between a first value and a second value. In some examples, the first value is zero. In some examples, the second value is one. In some examples, the SoC engine 150 receives or computes two or more of the relevance score 121, the timeliness score 123, the continuity score 125, or the accuracy score 127 (in any combination thereof). The relevance score 121, the timeliness score 123, the continuity score 125, and the accuracy score 127 may represent different attributes of the context data 108. The SoC engine 150 may store the relevance score 121, the timeliness score 123, the continuity score 125, and the accuracy score 127 in a memory device 163*a*.

As shown in FIG. 1A, the SoC engine 150 may receive or compute, using the SoC processor 161*a*, the relevance score 121. A relevance score 121 is a value that represents a level of semantic similarity between the query 138 and the retrieved context data 108. In other words, the relevance score 121 may quantify the pertinence of the context data 108 to a given context or inquiry. In some examples, the relevance score 121 may quantify how closely the context data 108 aligns with the user's needs (e.g., immediate need) and/or a topic at hand. In some examples, a higher relevance score 121 can indicate that the context data 108 is relatively more germane to the current context, while a lower relevance score 121 can indicate a potential divergence from the topic of interest. In some examples, the SoC engine 150 may compute the relevance score 121 based on the query 138 and/or the model response 130. In some examples, the SoC engine 150 may receive the relevance score 121 as part of receiving the search results (e.g., the context data 108). In some examples, the RAG system 115 may use data collection tools (e.g., web scrapers or API integrations) to collect data relevant to a particular context. In some examples, text analytics, sentiment analysis, and/or keyword extraction can subsequently measure the relevance of this context data 108 to the query 138.

The SoC engine 150, using the SoC processor 161*a*, may receive or compute the timeliness score 123. A timeliness score 123 may represent a level of freshness of the retrieved context data 108 (e.g., the context data 108 with an older timestamp may have a lower timeliness score 123). In some examples, the timeliness score 123 may quantify the recency or datedness of the context data 108. In some examples, the timeliness score 123 may quantify whether the context data 108 is current, recent, and/or potentially obsolete. In some examples, context data 108 that is more recent and/or aligns with the present time frame may achieve a higher timeliness score 123, while outdated or archaic context data 108 may have a lower timeliness score 123.

In some examples, the SoC engine 150 may compute the timeliness score 123 based on metadata (e.g., a timestamp of the context data 108) and/or analysis of the context datastore 106. In some examples, the SoC engine 150 may compute the timeliness score 123 based on a timestamp comparison, e.g., between a timestamp of the initiation of the query 138 and the timestamp of the context data 108 that is used to generate the model response 130. For example, the SoC engine 150 may compute the difference between the current time (e.g., when the query 138 is initiated) and the timestamp of the context data 108 used in the model response 130. In some examples, the SoC engine 150 may compute the timeliness score 123 based on a temporal distance between a first timestamp associated with the user prompt 126 and a second timestamp associated with the context data 108.

In some examples, the SoC engine 150 computes the timeliness score 123 based on Eq. (1) provided below:

$$T = 1 - \frac{\text{current time} - \text{data timestamp}}{\text{time threshold}} \quad \text{Eq. (1)}$$

The time threshold may be a predefined period beyond which data is considered outdated. The closer the timestamp is to the current time, the higher the timeliness score 123. In some examples, the timeliness score 123 may range from zero (e.g., outdated) to one (e.g., very recent).

The SoC engine 150 may receive or compute, using the SoC processor 161*a*, the continuity score 125. A continuity score 125 may represent a level of logical consistency (e.g., a higher score indicates a seamless flow of information). In some examples, the continuity score 125 may quantify the flow, coherence, and/or logical consistency of the context data 108. In some examples, the continuity score 125 may quantify whether the context data 108 maintains a uniform thread of thought and/or if there are abrupt breaks in the narrative. In some examples, a higher continuity score 125 may indicate a seamless flow of information, ensuring that the context builds organically without disjointed segments.

In some examples, the SoC engine 150 may compute the continuity score 125 based on the model response 130. In some examples, the SoC engine 150 computes the continuity score 125 based on pairwise similarity using embeddings. In some examples, the SoC engine 150 may convert each data point (e.g., context data portion such as a sentence or a paragraph) in the model response 130 into an embedding vector using an embedding model (e.g., a pre-trained model). For each consecutive pair of data points, the SoC engine 150 may calculate the cosine similarity between their vectors, where high similarity may indicate good continuity. In some examples, the SoC engine 150 may compute the continuity score 125 based on Eq. (2) as provided below:

$$C = \text{Average of Cosine Similarities for All Pairs} \quad \text{Eq. (2)}$$

The SoC engine 150 may compute the continuity score 125 by computing the cosine similarity between each consecutive pair of data points' embeddings and then average these similarities.

The SoC engine 150 may receive or compute, using the SoC processor 161*a*, the accuracy score 127. An accuracy score 127 may represent a level of reliability or truthfulness of data. In some examples, the accuracy score 127 may measure the veracity, reliability, and/or truthfulness of the contexts data 108. In some examples, the accuracy score 127 may quantify whether the context data 108 is factual, has been validated, and/or is free from errors or misrepresentations. In some examples, a high accuracy score 127 may ensure that the context data 108 introduced is trustworthy and/or dependable.

In some examples, the SoC engine 150 may compute the accuracy score 127 based on the model response 130. In some examples, the SoC engine 150 may compute the accuracy score 127 based on a number of iterations (e.g., iteration count 190 or referred to as a number of iterations) of the model response 130. In some examples, the iteration count 190 may refer to the number of regenerations associated with the user prompt 126. In some examples, the iteration count 190 is the number of times that the user has selected the re-generate control on the user interface 175. In some examples, the SoC engine 150 may compute the accuracy score 127 based on the iteration count and a threshold number of iteration counts. In some examples, the SoC engine 150 may count (e.g., track) the number of iterations (e.g., shots) the user goes through before confirming the correct response. In some examples, the SoC engine 150 may compute the accuracy score 127 based on Eq. (3) as provided below:

$$A = 1 - \frac{\text{Number of Iterations Required} - 1}{\text{Maximum Allowed Iterations}} \quad \text{Eq. (3)}$$

If the correct result is obtained on the first attempt, the SoC engine 150 may compute the accuracy score 127 as a first value (e.g., one). As the number of required iterations increases, the SoC engine 150 may decrease the accuracy score 127. In some examples, the threshold number of iterations (e.g., the maximum allowed iterations) may be a predefined value that sets a threshold for what is considered an acceptable number of attempts.

The SoC engine 150 may execute an SoC algorithm 139 to compute a SoC value 112 based on the relevance score 121, the timeliness score 123, the continuity score 125, and/or the accuracy score 127. In some examples, by computing the SoC value 112 with these types of attribute scores, the SoC engine 150 may account for the dynamic nature of context data 108 and how the significance of context data 108 for generating a model response 130 may change over time. The SoC value 112 may represent an overall level of effectiveness of the context data 108 for generating a model response 130 by the LLM 170. In some examples, the SoC engine 150 may compute the SoC value 112 based on an aggregation of the relevance score 121, the timeliness score 123, the continuity score 125, and/or the accuracy score 127. In some examples, the SoC algorithm 139 includes a weighted algorithm that applies weights to the relevance score 121, the timeliness score 123, the continuity score 125, and/or the accuracy score 127.

Figure 4:
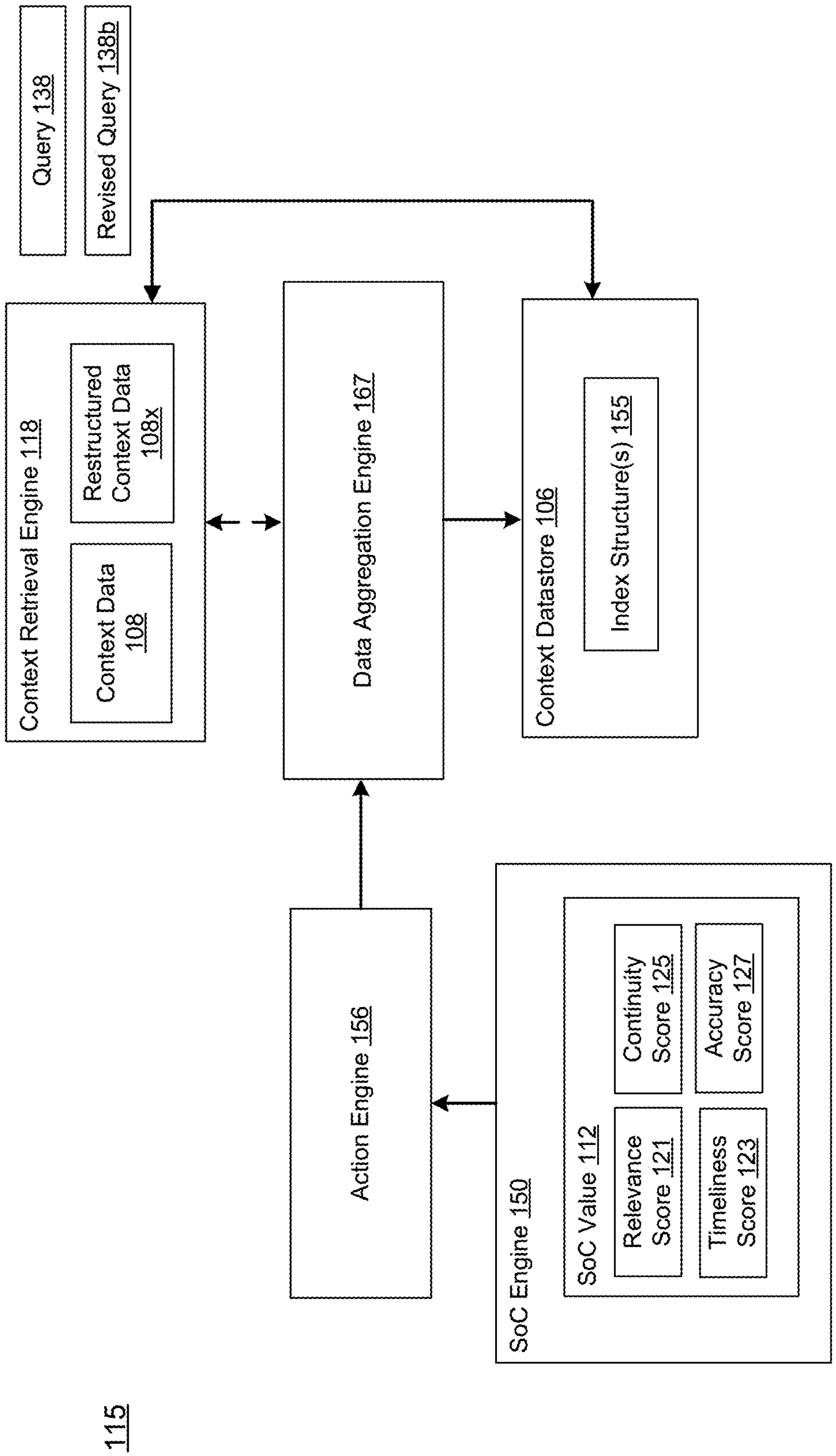
FIG. 4 illustrates an example computer action of aggregating data to increase a continuity score according to an aspect.

The SoC engine 150 may systematically evaluate the efficacy of context data 108 introduced to a LLM 170. In some examples, the SoC algorithm 139 can be configured to quantify dynamic data. In some examples, a SoC value 112 (e.g., a SoC metric) can be based on an SoC algorithm 139 that captures the essence of dynamic data. In some implementations of the SoC algorithm 139, one or more of the factors (e.g., scoring attributes) can be excluded, or the algorithm can be modified from the approach illustrated below. An example SoC algorithm is illustrated is illustrated in FIG. 4) provided below:

$$SoC = \frac{1}{\left(1 + e^{-k\left(w_R \cdot R + w_C \cdot C + w_T \cdot T + w_A \cdot A - threshold\right)}\right)} \quad \text{Eq. (4)}$$

The parameter R represents the relevance score 121 (also can be referred to as a relevance value) of the context data 108. The parameter C represents the continuity score 125 (also can be referred to as a continuity value), e.g., reflecting the flow or consistency of information. The parameter T represents the timeliness score 123 (also can be referred to as a timeliness value), e.g., denoting how recent or dated the data is. The parameter A represents the accuracy score 127 (also can be referred to as an accuracy value), e.g., a metric of the veracity of the context data 108. The weights ($w_R$, $w_C$, $w_T$, $w_A$) may be assigned to each attribute score, thereby allowing for customization based on specific needs. The parameter k is a factor to adjust the sensitivity of a sigmoid function, which may ensure that the SoC value 112 is within the desired bounds. The threshold may provide a benchmark value against which the combined weighted factors are evaluated.

In some examples, the weights are modifiers that allow for customized emphasis on each of the attribute scores (e.g., the scores noted above). In some examples, these weights ($w_R$, $w_C$, $w_T$, $w_A$) can be adjusted based on specific needs, priorities, and/or applications. In some examples, by adjusting these weights, the RAG system 115 may prioritize certain aspects of the context data 108 over others, thereby ensuring that the SoC algorithm 139 (and resulting SoC value 112) aligns (e.g., aligns closely) with one or more requirements.

Figure 1C:
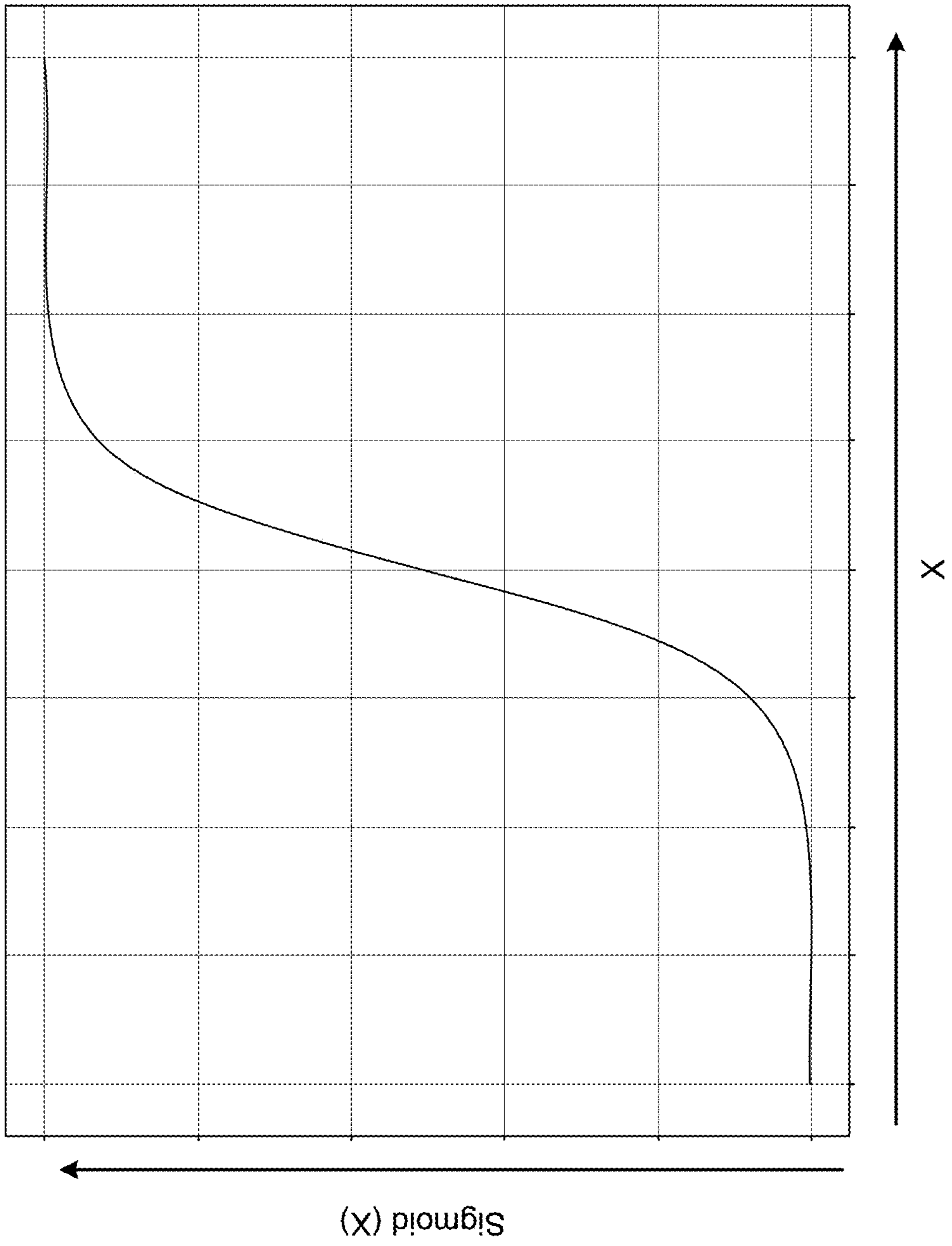
FIG. 1C illustrates an example sigmoid function curve for generating a significance of context value according to an aspect.

In some examples, the sigmoid function, often utilized in neural networks and logistic regression, maps any input into a value between a first value (e.g., zero) and a second value (e.g., one). FIG. 1C illustrates an example sigmoid function. In some examples, the S-shaped curve may be particularly useful in the SoC algorithm 139 to ensure that the final value remains within this range, regardless of the inputs. In some examples, the sigmoid function may be represented by Eq. (5) provided below:

$$S(x) = \frac{1}{(1+e^{-x})} \quad \text{Eq. (5)}$$

Some of the properties can include, for example, boundedness (e.g., the function's output can be (e.g., is always) in the range (0,1), making it a good candidate for probability estimations, S-shape (e.g., the function displays an S-shaped curve, ensuring a smooth transition between values), differentiability (e.g., the sigmoid function is continuous and differentiable, making it amenable to gradient-based optimization methods), and/or monotonicity (e.g., the function is increasing or decreasing, ensuring a predictable response to changing inputs). In some examples, by incorporating the sigmoid function, the SoC algorithm 139 can ensure that the final metric is both interpretable and bounded, simplifying its applicability and understanding.

In some examples, various aspects of the SoC algorithm 139 can be derived and/or implemented based on intricate properties that define context data 108. In some examples, the SoC algorithm 139 may be based on an aggregation of the scoring attributes as shown in Eq. (6) provided below:

$$SoC = R + C + T + A \quad \text{Eq. (6)}$$

In some examples, the SoC algorithm 139 may incorporate weights (e.g., $w_R$, $w_C$, $w_T$, $w_A$), as provided in Eq. (7) provided below:

$$SoC = w_R \cdot R + w_C \cdot C + w_T \cdot T + w_A \cdot A \quad \text{Eq. (7)}$$

Some implementations can include boundaries. In some examples, for a metric to be interpretable and standardized, having a fixed range can be beneficial. In some examples, a function that could squash the summative values into a bounded range, making it consistent and interpretable, can be implemented.

In some examples, the SoC algorithm 139 may incorporate the sigmoid function, as shown in Eq. (8) as provided below:

$$SoC = \frac{1}{(1+e^{-k(w_R \cdot R + w_C \cdot C + w_T \cdot T + w_A \cdot A)})} \quad \text{Eq. (8)}$$

In some implementations various aspects of fine-tuning and adjustability can be introduced and/or included in an SoC algorithm 139. Some implementations can provide more control over the sensitivity of the SoC algorithm 139 (and resulting SoC value 112) by using the parameter k. In some examples, this can affect the steepness of the sigmoid curve, allowing for a sharper or smoother transition based on the significance of context properties.

Figure 1D:
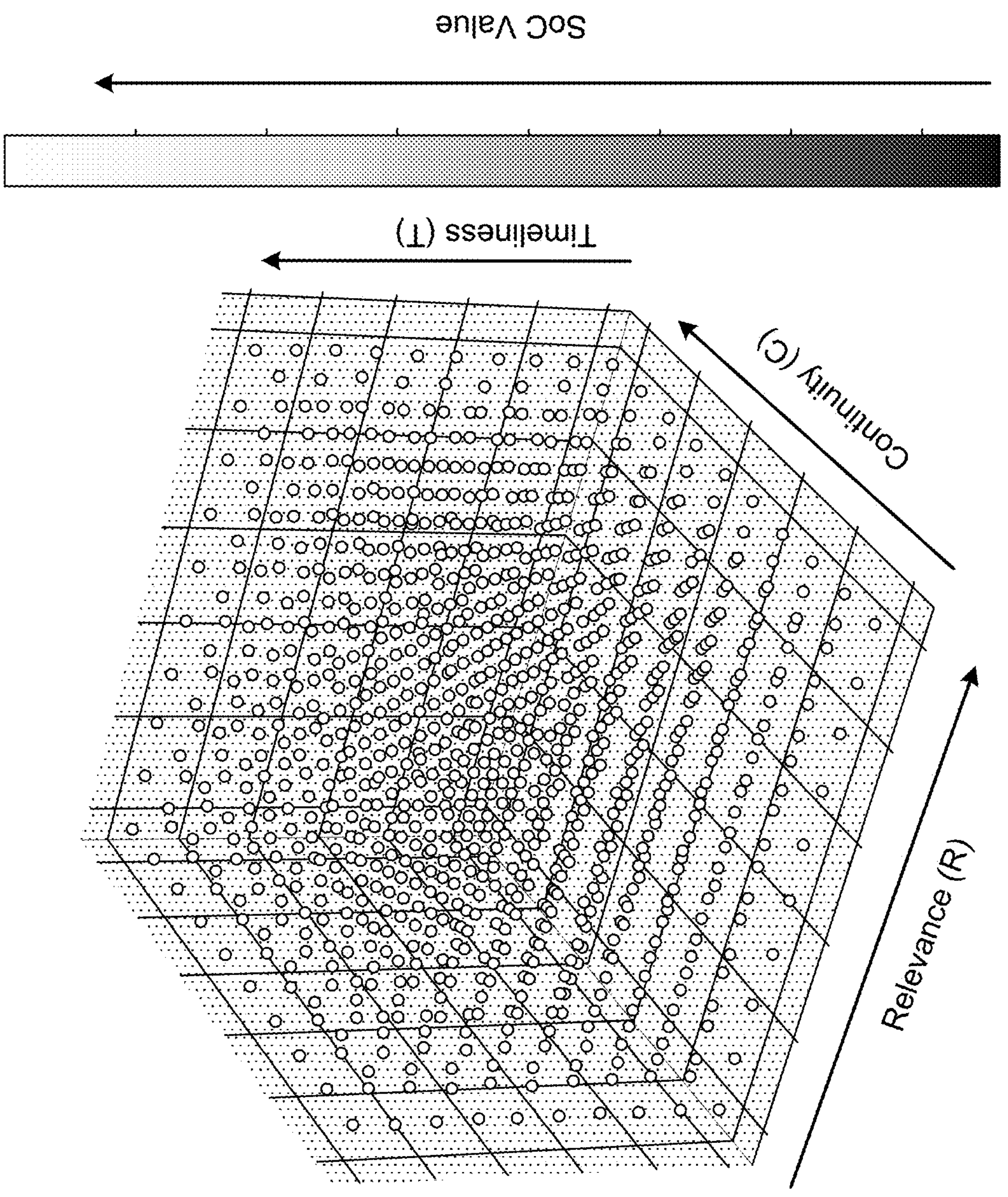
FIG. 1D illustrates a graph depicting example interactions of attribute scores and significance of context values according to an aspect.

Some implementations can include a threshold to shift the sigmoid function horizontally. In some implementations, this can allow for the calibration of the metric to specific standards or expectations. In some implementations, all the aforementioned iterations can result in the SoC algorithm 139 as shown in Eq. (4). FIG. 1D illustrates an interaction of the relevance score 121, the continuity score 125, and the timeliness score 123 in a graph that illustrates resulting SoC values 112 based on combinations of relevance, continuity, and timeliness values.

The SoC engine 150 may calculate the SoC value 112 using a variety of SoC algorithms in addition to or different from SoC algorithm 139. In some examples, the SoC engine 150 may calculate, using the SoC processor 161*a*, the SoC value 112 based on an SoC algorithm 139 that includes the relevance score 121 and the continuity score 125 (and excludes the timeliness score 123 and the accuracy score 127). In some examples, the SoC engine 150 may calculate the SoC value 112, using the SoC processor 161*a*, based on an SoC algorithm 139 that includes the relevance score 121 and the timeliness score 123 (and excludes the continuity score 125 and the accuracy score 127).

The SoC engine 150 may store the SoC value 112 in the memory device 163*a*. In some examples, the SoC engine 150 may compute the SoC value 112 for each model response 130 that was generated using context data 108. In some examples, the SoC engine 150 may compute the SoC value 112 and the score attributes (e.g., the relevance score 121, the timeliness score 123, the continuity score 125, and/or the accuracy score 127) that are used to compute the SoC value 112 in the memory device 163*a*.

In some examples, as shown in FIG. 1B, the user interface 175 displays one or more feedback controls 133 to enable the user to submit feedback about the model response 130. In response to selection(s) of the feedback control(s) 133, the RAG system 115 may store feedback data 153. In some examples, the feedback data 153 is stored with respect to a chat session with the LLM 170. In some examples, the feedback data 153 is stored with respect to a pair of the user prompt 36 and the resulting model response 130. In some examples, the feedback controls 133 includes UI elements that enable the user to indicate whether the user is satisfied and/or not satisfied with the model response 130 (e.g., a binary selection or selection of a scale, e.g., 1 out of 5 stars, 2 out of 5 starts, etc.). In some examples, the feedback controls 133 includes a regenerate control that enables the user to regenerate the model response 130 (e.g., without the submission of another user prompt 126). In some examples, the feedback controls 133 include UI controls that enable the user to indicate a level of accuracy, relevance, continuity, and/or timeliness (e.g., controls that correspond to the relevance score 121, the timeliness score 123, the continuity score 125, and/or the accuracy score 127). Based on selection of the feedback controls 133, the RAG system 115 stores the feedback data 153 in the database 102.

As shown in FIGS. 1A and 1B, the RAG system 115 may include an action engine 156 configured to implement one or more computer actions based on the SoC value 112 and/or one or more of the attribute scores (e.g., the relevance score 121, the timeliness score 123, the continuity score 125, and/or the accuracy score 127). For example, in response to the SoC value 112 being detected as less than a threshold level, the action engine 156 may execute one or more computer actions to increase the SoC value 112. In some examples, in response to one or more of attribute scores (e.g., (e.g., the relevance score 121, the timeliness score 123, the continuity score 125, and/or the accuracy score 127) being detected as less than a threshold level, the action engine 156 may execute one or more computer actions to increase the lower attribute score(s), thereby increasing the SoC value 112. In some examples, the computing actions include monitoring the Soc value 112 and/or one or more of the scoring attributes (e.g., (e.g., the relevance score 121, the timeliness score 123, the continuity score 125, and/or the accuracy score 127).

The computer actions may include generating a revised user prompt to include domain specific language (e.g., relevancy adjustment via query rewriting), adjusting data retention policies, prioritizing recent data, reindexing data, grouping or sorting context data 108 to create a more continuous and logically consistent dataset, restructuring how data is indexed or queried, reordering search results based on semantic relevance, generating intermediary data points that bridge gaps in the retrieved context data, adjusting the SoC algorithm 139 (including adjusting the weights of the SoC algorithm 139), and/or reindexing data.

In some examples, the action engine 156 includes a machine-learning (ML) model 194 configured to determine whether, and, if so, which computer to implement based on the SoC value 112 and/or one or more of the attribute scores (e.g., the relevance score 121, the timeliness score 123, the continuity score 125, and/or the accuracy score 127). In some examples, the ML model 194 may receive a plurality of signals as inputs, where the plurality of signals indicating the SoC value 112 and the attribute scores that are used to compute the SoC value 112. In some examples, the ML model 194 may also receive the feedback data 153 and the iteration count 190. Based on the inputs, the ML model 194 may compute a prediction on whether to implement a computer action to increase the SoC value 112, e.g., activating a query rewrite module 162, an index lifecycle manager 164, a data aggregation engine 167, a semantic ranking engine 171, an adaptive context engine 174, a SoC engine adjustor 180, and/or any other computer action discussed herein.

In some examples, the prompt manager 114 includes one or more connectors 134, where each connector 134 corresponds to a different LLM 170. A connector 134 may be a computer object that is stored at the RAG system 115 and includes information that enables a prompt manager 114 to communicate with a corresponding LLM 170. In some examples, the prompt manager 114 is configured to operate in conjunction with an abstraction library. The abstraction library may define a library that generates an augmented prompt 124 with a generic format that may be used by any of the LLMs 170 with connectors 134 stored at the RAG system 115. The use of the connectors 134, and, in some examples, the abstraction library may enable the RAG system 115 to be agnostic to a plurality of LLMs 170. The techniques discussed herein provide the user freedom to use a variety of different LLMs 170, as well as the ability to pivot between multiple LLMs 170 at any point in time, which may provide improvements in cost control, speed, and/or privacy.

In some examples, a particular LLM 170 is selectable by a user. The user interface 175 may display a list of LLM identifiers such as a first LLM identifier associated with a first LLM, and a second LLM identifier associated with a second LLM. Each LLM identifier that is included in the list has a corresponding connector 134 that is used by a prompt manager 114 to communicate with a respective LLM 170. In response to selection of the first LLM identifier, the prompt manager 114 may use a first connector to transmit an augmented prompt 124 to the first LLM. In response to selection of the second LLM identifier, the prompt manager 114 may use a second connector to transmit an augmented prompt 124 to the second LLM.

Figure 2:
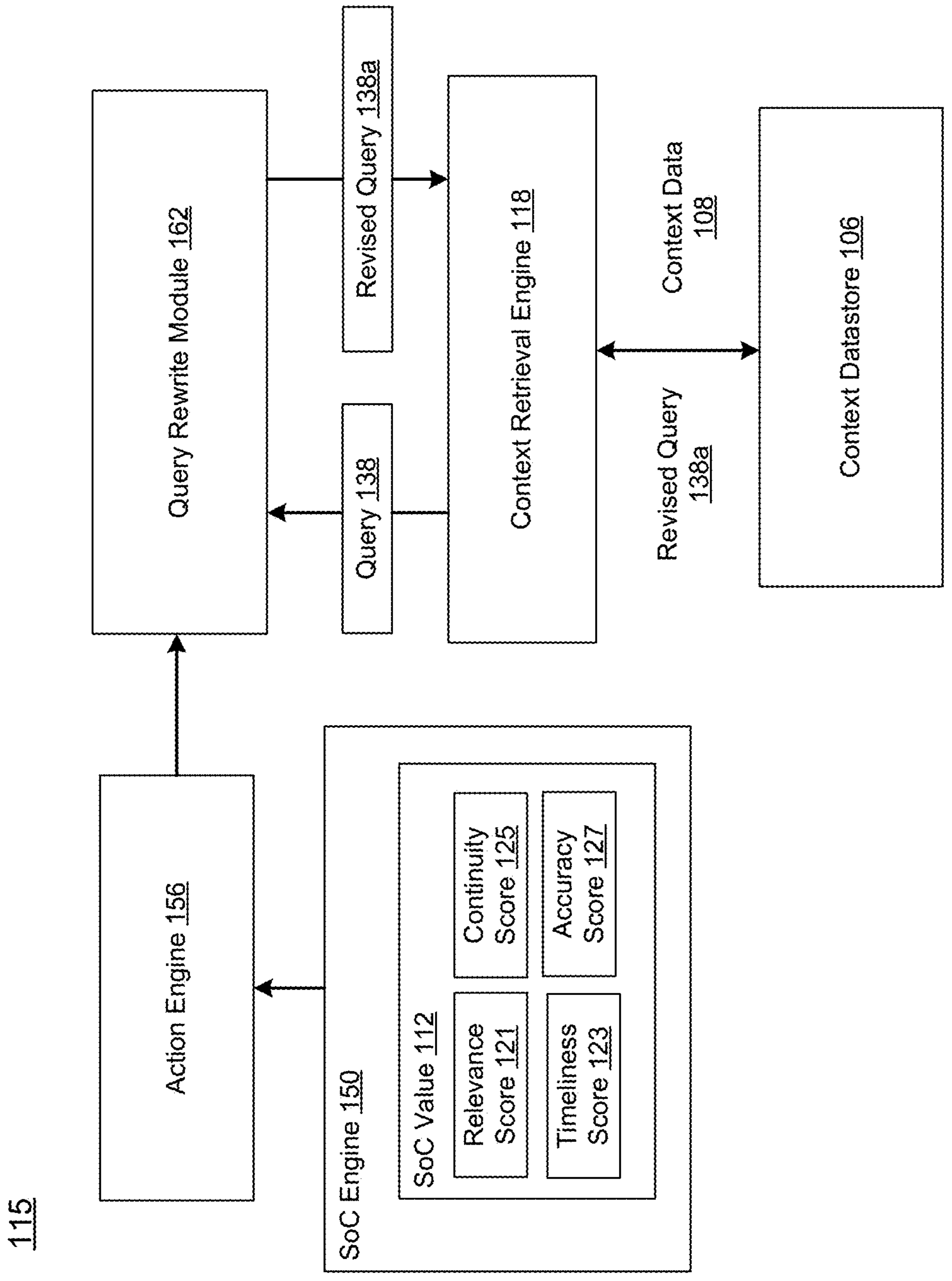
FIG. 2 illustrates an example computer action of rewriting queries to increase a relevance score according to an aspect.

FIG. 2 illustrates an aspect of the RAG system 115 that triggers a query rewrite module 162 for executing a query rewrite to increase the SoC value 112. For example, the action engine 156 may receive the SoC value 112, and, in some examples, the relevance score 121, the timeliness score 123, the continuity score 125, and the accuracy score 127. In some examples, the action engine 156 may detect that the SoC value 112 is equal to or less than a threshold level. In response to the detection of the SoC value 112 being equal to or less than the threshold level, in some examples, the action engine 156 may determine which attribute score is the lowest among the attribute scores (e.g., the relevance score 121, the timeliness score 123, the continuity score 125, and/or the accuracy score 127). In some examples, if the relevance score 121 is determined as the lowest among the attribute scores, the action engine 156 may programmatically trigger a query rewrite module 162 to generate a revised query 138*a* using a search template or a query domain-specific language.

In some examples, when the query rewrite module 162 is activated (e.g., triggered), the context retrieval engine 118 may transmit the query 138 to the query rewrite module 162, which returns a revised query 138*a*. The revised query 138*a* may include additional (or alternative information for some terms) and/or a query format different from the query 138. In some examples, the revised query 138*a* may include one or more domain-specific terms in replace of one or more original times and/or one or more constructs (e.g., Boolean operators, proximity operators, range queries, wildcard matching, etc.) not included in the original prompt. The revised query 138*a* is used to search and retrieve context data 108. The use of the revised query 138*a* provided by the query rewrite module 162 may increase the relevance of the context data 108 to the revised query 138*a*, thereby increasing the SoC value 112.

In some examples, the query rewrite module 162 may define one or more templates that defines the structure of search queries (e.g., revised queries 138*a*), allowing for dynamic parameterization and customization. A template may include one or more placeholder variables that represent dynamic values that can be substituted with specific data at query time. A template may include a template language that defines the syntax and rules for constructing a template (e.g., using a template syntax or a scripting language). In some examples, the query rewrite module 162 may use a query DSL, which may be a specialized language for expressing queries (e.g., revised queries 138*a*) within a specific domain (e.g., the context datastore 106). The query DSL may include one or more domain-specific constructs, including keywords, operators, and/or data types relevant to the search domain (e.g., the context datastore 106). The query DSL may define one or more rules for combining search terms and conditions to form valid queries. In some examples, the query DSL may define a DSL parser that interprets the query 138 to transform the query 138 to the revised query 138*a*, e.g., an internal representation that can be executed by the context retrieval engine 118.

Figure 3:
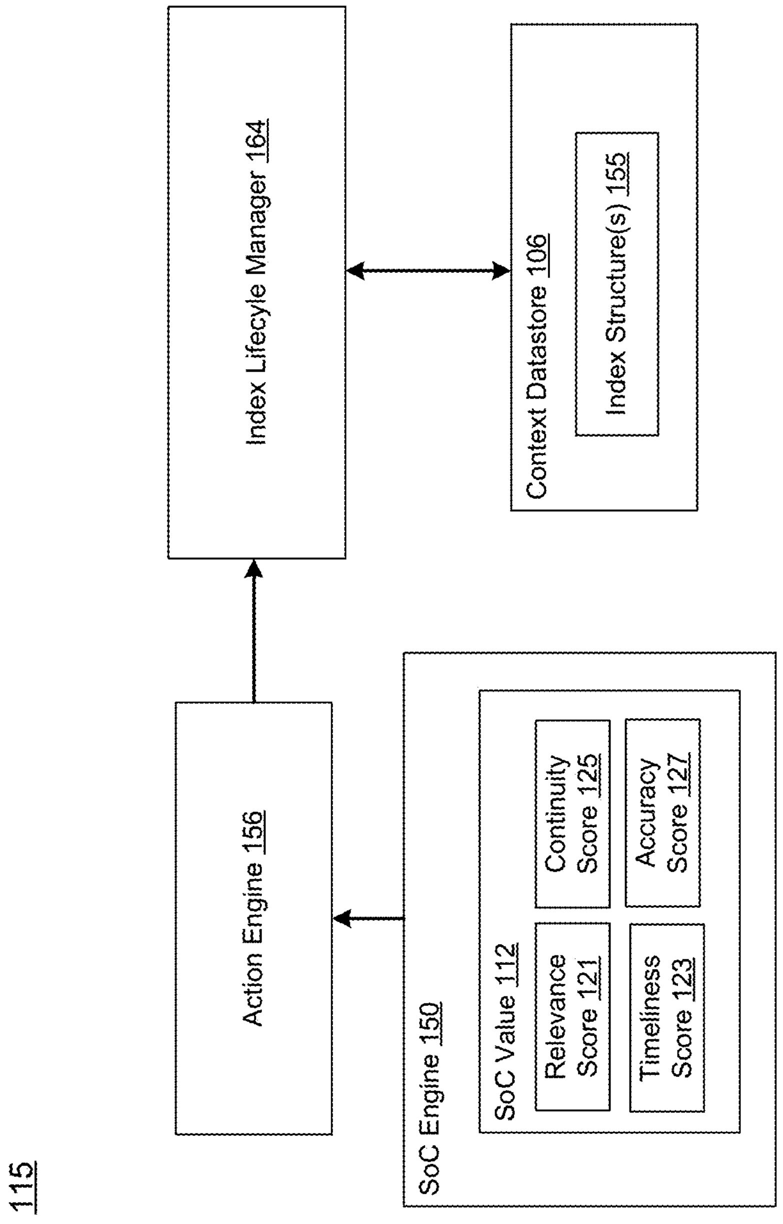
FIG. 3 illustrates an example computer action of updating an index structure of a context datastore to increase a timeliness score according to an aspect.

FIG. 3 illustrates an aspect of the RAG system 115 that triggers an index lifecycle manager 164 for dynamically updating an index structure 155 of the context datastore 106 to increase a timeliness score 123 according to an aspect. For example, the action engine 156 may receive the SoC value 112, and, in some examples, the relevance score 121, the timeliness score 123, the continuity score 125, and the accuracy score 127. In some examples, the action engine 156 may detect that the SoC value 112 is equal to or less than a threshold level. In response to the detection of the SoC value 112 being equal to or less than the threshold level, in some examples, the action engine 156 may determine which attribute score is the lowest among the attribute scores (e.g., the relevance score 121, the timeliness score 123, the continuity score 125, and/or the accuracy score 127). In some examples, if the timeliness score 123 is determined as the lowest among the attribute scores, the action engine 156 may programmatically trigger the index lifecycle manager 164 to update the index structure 155 of the context datastore 106. The index lifecycle manager 164 may automate the management of index structures 155 based on rules and policies (e.g., data retention policies). In some examples, the index lifecycle manager 164 may update one or more data retention policies to remove or deprioritize data in the index structure having timestamps that are older than a threshold level. In some examples, the index lifecycle manager 164 may update the index structure 155 to prioritize data with timestamps that are newer than a threshold level.

FIG. 4 illustrates an aspect of the RAG system 115 that triggers a data aggregation engine 167 to generate restructured context data 108*x* by grouping and/or sorting context data 108 to increase a continuity score 125 according to an aspect. For example, the action engine 156 may receive the SoC value 112, and, in some examples, the relevance score 121, the timeliness score 123, the continuity score 125, and the accuracy score 127. In some examples, the action engine 156 may detect that the SoC value 112 is equal to or less than a threshold level. In response to the detection of the SoC value 112 being equal to or less than the threshold level, in some examples, the action engine 156 may determine which attribute score is the lowest among the attribute scores (e.g., the relevance score 121, the timeliness score 123, the continuity score 125, and/or the accuracy score 127).

In some examples, if the continuity score 125 is determined as the lowest among the attribute scores, the action engine 156 may programmatically trigger the data aggregation engine 167 to group and/or sort the context data 108, thereby creating a more continuous and/or logical consistent dataset. When the data aggregation engine 167 is triggered, in some examples, the context retrieval engine 118 may retrieve context data 108 from the context datastore 106 that satisfies a query 138, and then invoke the data aggregation engine 167 to group and/or sort the context data 108, thereby producing restructured context data 108*x*. Then, the context retrieval engine 118 uses the restructured context data 108*x* in the augmented prompt 124. When the data aggregation engine 167 is triggered, in some examples, the data aggregation engine 167 may initiate a restructure operation on the index structure 155 to provide a more consistent dataset. When a query 138 is submitted to the context datastore 106, the retrieved content includes the restructured context data 108*x*. In some examples, when the data aggregation engine 167 is triggered, the context retrieval engine 118 may communicate with the data aggregation engine 167 to generate a revised query 138*b*, which adjusts how the context datastore 106 is searched, where the returned data includes the restructured context data 108*x*.

Figure 5:
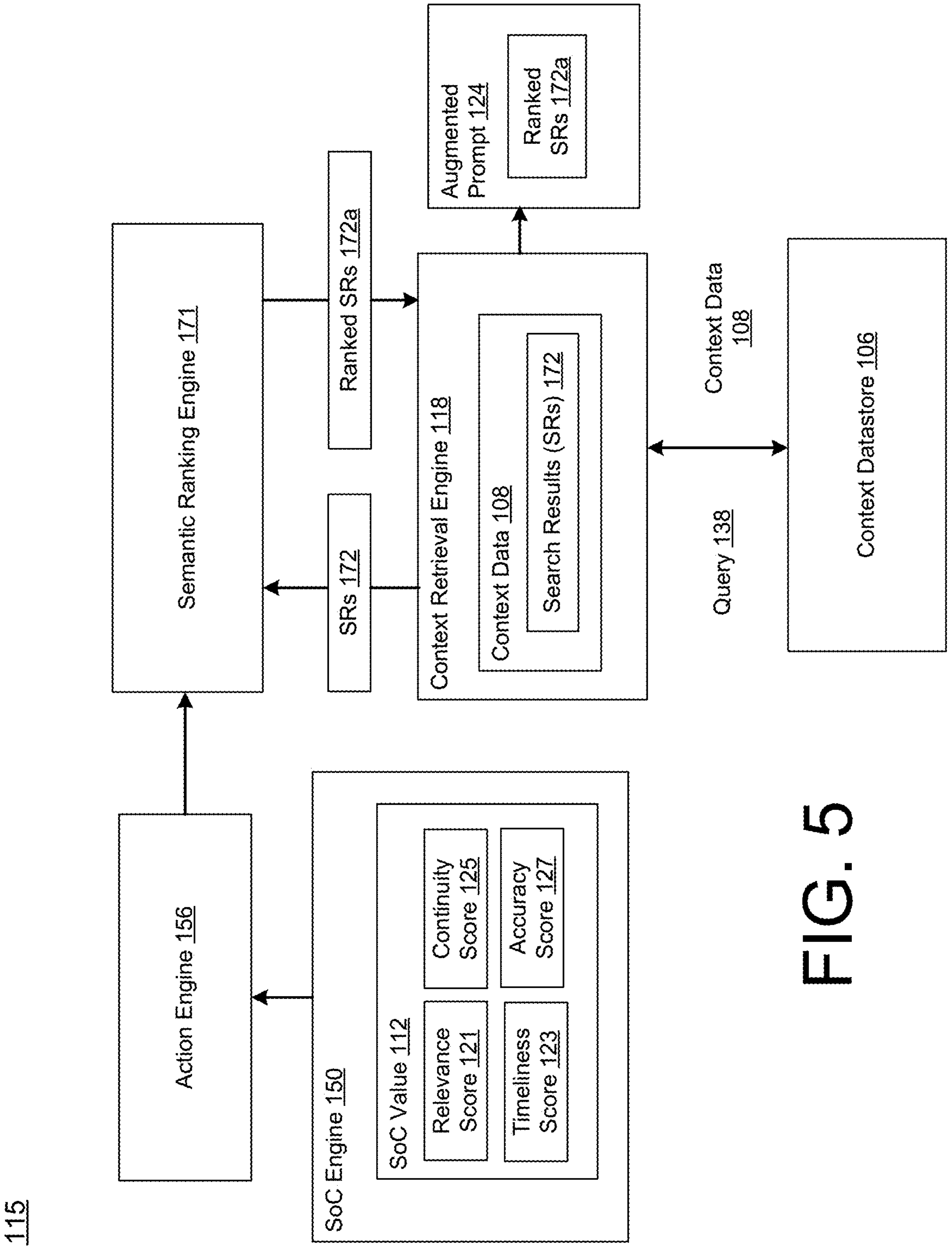
FIG. 5 illustrates an example computer action of ranking search results to increase a relevance score according to an aspect.

FIG. 5 illustrates an aspect of the RAG system 115 that triggers a semantic ranking engine 171 that generates ranked search results 172*a* by ranking search results 172 (e.g., context data 108) to increase the SoC value 112. For example, the action engine 156 may receive the SoC value 112, and, in some examples, the relevance score 121, the timeliness score 123, the continuity score 125, and the accuracy score 127. In some examples, the action engine 156 may detect that the SoC value 112 is equal to or less than a threshold level. In response to the detection of the SoC value 112 being equal to or less than the threshold level, in some examples, the action engine 156 may determine which attribute score is the lowest among the attribute scores (e.g., the relevance score 121, the timeliness score 123, the continuity score 125, and/or the accuracy score 127). In some examples, if the relevance score 121 is determined as the lowest among the attribute scores, the action engine 156 may programmatically trigger the semantic ranking engine 171 to rank the search results 172 returned from the context datastore 106. The semantic ranking engine 171 may order the search results 172 based on semantic relevance, which may prioritize search results 172 that are more semantically aligned with the query 138, as determined by the SoC value 112, ensuring that contextually appropriate results are surfaced at the top of the list.

In some examples, when the semantic ranking engine 171 is activated (e.g., triggered), the context retrieval engine 118 may retrieve context data 108 (e.g., search results 172) from the context datastore 106 using a query 138. The context retrieval engine 118 may communicate with the semantic ranking engine 171, e.g., transmitting the search results 172 to the semantic ranking engine 171 and then receiving the ranked search results 172*a*. The context retrieval engine 118 uses the ranked search results 172*a* in the augmented prompt 124. The use of the ranked search results 172*a* may increase the relevance of the context data 108 to the query 138, thereby increasing the SoC value 112.

Figure 6:
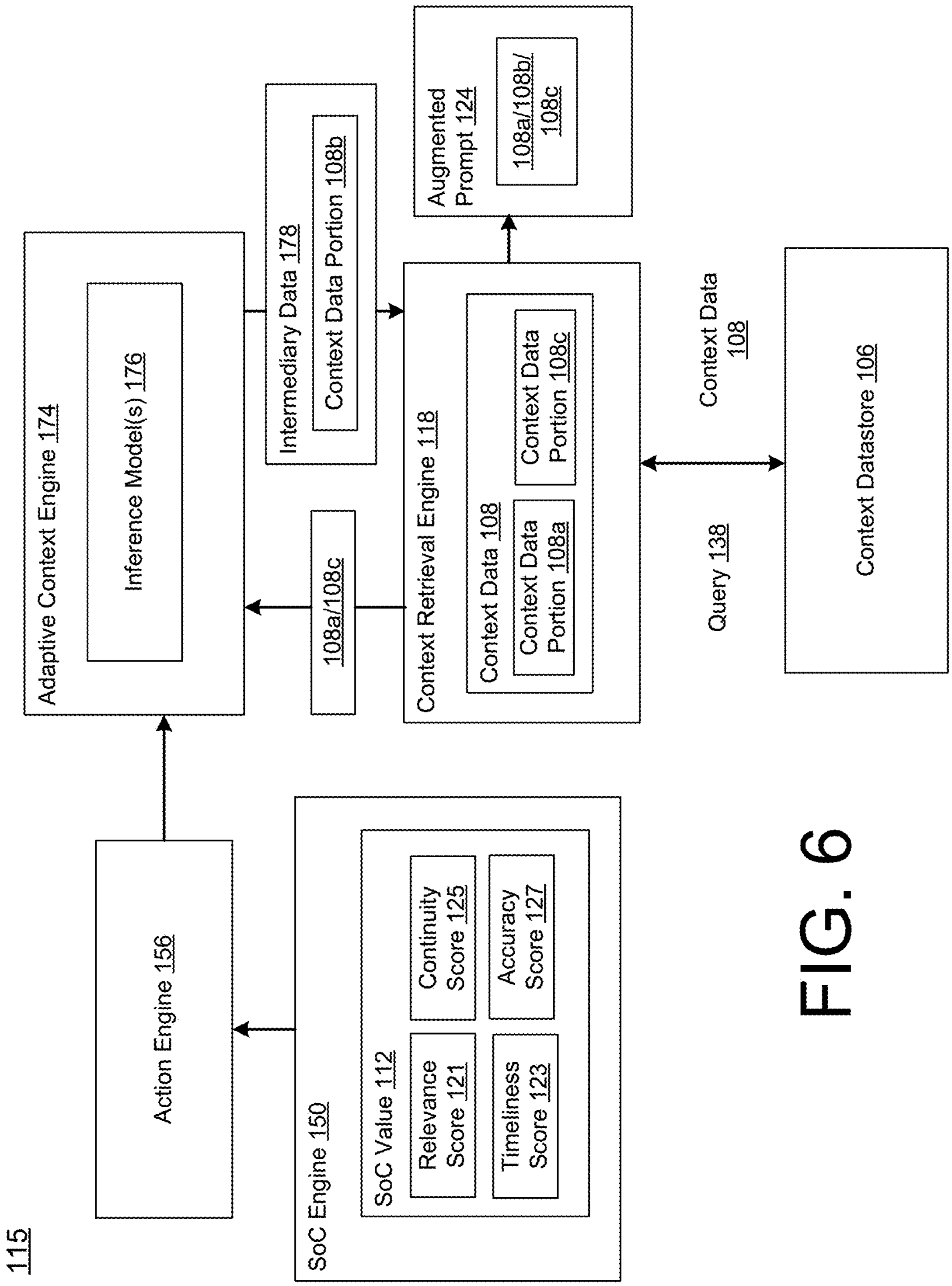
FIG. 6 illustrates an example computer action of generating intermediary data to increase a continuity score according to an aspect.

FIG. 6 illustrates an aspect of the RAG system 115 that triggers an adaptive context engine 174 that generates intermediary data 178 that bridges a gap in the retrieved data to increase the SoC value 112. For example, the action engine 156 may receive the SoC value 112, and, in some examples, the relevance score 121, the timeliness score 123, the continuity score 125, and the accuracy score 127. In some examples, the action engine 156 may detect that the SoC value 112 is equal to or less than a threshold level. In response to the detection of the SoC value 112 being equal to or less than the threshold level, in some examples, the action engine 156 may determine which attribute score is the lowest among the attribute scores (e.g., the relevance score 121, the timeliness score 123, the continuity score 125, and/or the accuracy score 127). In some examples, if the continuity score 125 is determined as the lowest among the attribute scores, the action engine 156 may programmatically trigger the adaptive context engine 174 to generate content to fill-in missing content, thereby providing a more logical consistent dataset.

In some examples, the adaptive context engine 174 includes one or more inference models 176 configured to receive context data 108 (e.g., context data portion 108*a*, context data portion 108*c*) retrieved from the context datastore 106 as inputs, and output intermediary data 178 (e.g., context data portion 108*b*). In some examples, the context data portion 10*b* may bridge the gap between the context data portion 108*a* and the context data portion 108*a*.

When the adaptive context engine 174 is activated (e.g., triggered), the context retrieval engine 118 may retrieve context data 108 (e.g., context data portion 108*a*, context data portion 108*b*) from the context datastore 106 using a query 138. The context retrieval engine 118 may communicate with the adaptive context engine 174, e.g., transmitting the retrieved context data 108 (e.g., context data portion 108*a*, context data portion 108*c*) to the adaptive context engine 174 and then receiving the intermediary data 178 (e.g., the context data portion 108*b*). The context retrieval engine 118 combines the context data portion 108*a*, the context data portion 108*b*, and the context data portion 108*c*, and includes the combined data in the augmented prompt 124. The use of the adaptive context engine 174 may increase the continuity score 125, thereby increasing the SoC value 112.

Figure 7:
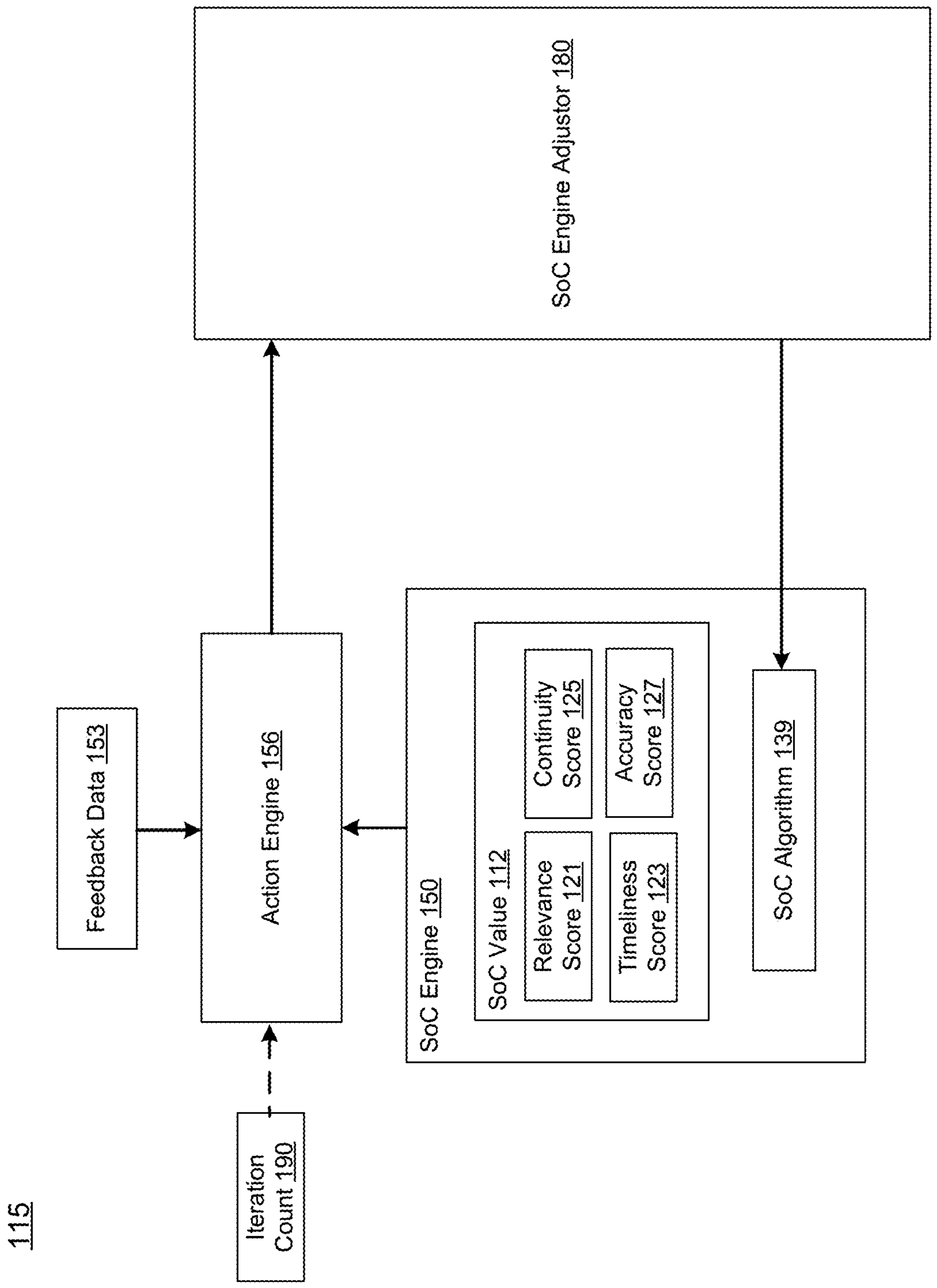
FIG. 7 illustrates an example computer action to adjust an algorithm based on feedback data and/or iteration count according to an aspect.

FIG. 7 illustrates an aspect of the RAG system 115 that triggers an SoC engine adjustor 180 configured to adjust one or more aspects of the SoC algorithm 139 to increase the SoC value 112. The action engine 156 may receive the SoC value 112, and, in some examples, the relevance score 121, the timeliness score 123, the continuity score 125, and the accuracy score 127. In some examples, the action engine 156 may receive an iteration count 190 and/or the feedback data 153 and determine whether to activate the SoC engine adjustor 180 based on iteration count 190 exceeding a threshold level and/or the feedback data 153 indicating that the user's feedback about the accuracy of the model response 130 is a threshold distance away from the accuracy score 127 computed by the SoC engine 150.

For example, via the feedback controls 133, the RAG system 115 may collect user feedback related to search results, such as ratings on relevance, accuracy, or timeliness and store them as feedback data 153. In some examples, the action engine 156 may analyze the feedback data 153 to determine whether there are inconsistencies between the user provided feedback and the attribute scores, and, if so, may trigger the SoC engine adjustor 180 to adjust the SoC algorithm 139. In some examples, the SoC engine adjustor 180 may adjust the SoC algorithm 139 based on the feedback data 153. For example, if the user's feedback indicates that a particular model response 130 has low accuracy but the accuracy score 127 has a high score, the SoC engine adjustor 180 may adjust the SoC algorithm 139, e.g., by refining the SoC calculations and/or adjusting the weights.

For example, the action engine 156 may monitor the number of shots (e.g., iteration count 190) it takes for a user to obtain the correct result. If users require multiple iterations to reach the desired outcome, it indicates a lower accuracy in the system's output. In some examples, the action engine 156 may monitor an iteration count 190, e.g., the number of user prompts submission and/or regenerations before achieving a satisfactory result. If the action engine 156 detects a high number of shots, it triggers a feedback loop to analyze and refine the system's output, adjusting the SoC algorithm 139 to improve accuracy in future queries. This may involve refining context, reordering results, or enhancing query processing to reduce the number of iterations needed for accurate results.

Referring back to FIG. 1B, the computing device 152 may be any type of computing device that includes one or more processors 101, one or more memory devices 103, a display 154, and an operating system 105 configured to execute (or assist with executing) one or more applications 166, including a chat application 168. The chat application 168 may be a program configured to communicate with the context retrieval engine 118. In some examples, the chat application 168 is a native application installable on the operating system 105. In some examples, the chat application 168 is a web application executable by a browser application (e.g., one of the applications 166). In some examples, the chat application 168 is a web page executable by a browser application. In some examples, the user interface 175 is an interface of the chat application 168. In some examples, the computing device 152 is a laptop computer. In some examples, the computing device 152 is a desktop computer. In some examples, the computing device 152 is a tablet computer. In some examples, the computing device 152 is a smartphone. In some examples, the computing device 152 is a wearable device (e.g., a head-mounted display device such as an augmented reality (AR) or a virtual reality (VR) device).

A browser application is a web browser configured to access information on the Internet. The browser application may launch one or more browser tabs in the context of one or more browser windows on a display 154 of the computing device 152. A browser tab may display content (e.g., web content) associated with a web document (e.g., webpage, PDF, images, videos, etc.) and/or an application such as a web application, progressive web application (PWA), and/or extension. A web application may be an application program that is stored on a remote server (e.g., server computer 160) and delivered over the network through the browser application (e.g., a browser tab). In some examples, the user interface 175 is not an interface of a browser application.

The operating system 105 is a system software that manages computer hardware, software resources and provides common services for the applications 166. In some examples, the operating system 105 is an operating system designed for a larger display 154 such as a laptop or desktop (e.g., sometimes referred to as a desktop operating system). In some examples, the operating system 105 is an operating system for a smaller display 154 such as a tablet or a smartphone (e.g., sometimes referred to as a mobile operating system). In some examples, the chat application 168 is executable by the operating system 105. The chat application 168 may receive the user prompt 126 via the input field 165 of the user interface 175, and the chat application 168 may transmit the user prompt 126 to the context retrieval engine 118.

The processor(s) 101 may be formed in a substrate configured to execute one or more machine executable instructions or pieces of software, firmware, or a combination thereof. The processor(s) 101 can be semiconductor-based—that is, the processors can include semiconductor material that can perform digital logic. The memory device(s) 103 may include a main memory that stores information in a format that can be read and/or executed by the processor(s) 101. The memory device(s) 103 may store the operating system 105, including the chat application 168 that, when executed by the processors 101, performs certain operations discussed with reference to the chat application 168 discussed herein. In some examples, the memory device(s) store one or more portions of the RAG system 115 that, when executed by the processors 101, performs certain operations discussed with reference to the RAG system 115.

In some examples, the memory device(s) 103 includes a non-transitory computer-readable medium that includes executable instructions that cause at least one processor (e.g., the processors 101) to execute the operations discussed herein.

The server computer 160 may be computing devices that take the form of a number of different devices, for example a standard server, a group of such servers, or a rack server system. The server computer 160 may represent a single server computer or multiple server computer. In some examples, the server computer 160 may represent multiple server computers that are in communication with each other. In some examples, the server computer 160 may be a single system sharing components such as processors and memories. In some examples, the server computer 160 may be multiple systems that do not share processors and memories. The network may include the Internet and/or other types of data networks, such as a local area network (LAN), a wide area network (WAN), a cellular network, satellite network, or other types of data networks. The network may also include any number of computing devices (e.g., computers, servers, routers, network switches, etc.) that are configured to receive and/or transmit data within the network. The network may further include any number of hardwired and/or wireless connections.

The server computer(s) 160 may include one or more processors 161 formed in a substrate, an operating system (not shown) and one or more memory devices 163. The memory device(s) 163 may represent any kind of (or multiple kinds of) memory (e.g., RAM, flash, cache, disk, tape, etc.). In some examples (not shown), the memory devices may include external storage, e.g., memory physically remote from but accessible by the server computer(s) 160. The processor(s) 161 may be formed in a substrate configured to execute one or more machine executable instructions or pieces of software, firmware, or a combination thereof. The processor(s) 161 can be semiconductor-based—that is, the processors can include semiconductor material that can perform digital logic. The memory device(s) 163 may store information in a format that can be read and/or executed by the processor(s) 161. The memory device(s) 163 may store one or more portions of the RAG system 115, that, when executed by the processor(s) 161, perform certain operations discussed herein. In some examples, the memory device(s) 163 includes a non-transitory computer-readable medium that includes executable instructions that cause at least one processor (e.g., the processor(s) 161) to execute operations.

The LLM 170 may include any type of pre-trained LLM configured to generate a model response 130 in response to a prompt 124. In some examples, the LLM 170 is stored on a server computer 160*a* that is separate from the server computer 160 that hosts the RAG system 115. The server computer 160*a* may be server computing resources that are owned and/or managed by an entity that is separate from an entity that owns and/or manages the server computer 160. In some examples, the LLM 170 is not owned or managed by the organization associated with the database 102. In some examples, the LLM 170 is a third-party LLM that is not managed or owned by the system 100. In some examples, the LLM 170 is a predefined LLM that is managed or owned by the system 100. In some examples, the LLM 170 is stored on the server computer 160 that hosts the RAG system 115.

The LLM 170 includes weights. The weights are numerical parameters that the LLM 170 learns during the training process. The weights are used to compute the output (e.g., the model response 130) of the LLM 170. The LLM 170 may receive the prompt 124 from the prompt manager 114. The LLM 170 includes a pre-processing engine configured to pre-process the information in the prompt 124. Pre-processing may include converting the textual input of the prompt 124 to individual tokens (e.g., words, phrases, or characters). Pre-processing may include other operations such as removing stop words (e.g., "the", "and", "of") or other terms or syntax that do not impart any meaning to the LLM 170. The LLM 170 includes an embedding engine configured to generate word embeddings from the pre-processed text input. The word embeddings may be vector representations that assist the LLM 170 to capture the semantic meaning of the input tokens and may assist the LLM 170 to better understand the relationships between the input tokens.

The LLM 170 includes neural network(s) configured to receive the word embeddings and generate an output. A neural network includes multiple layers of interconnected neurons (e.g., nodes). The neural network may include an input layer, one or more hidden layers, and an output later. The output may include a sequence of output word probability distributions, where each output distribution represents the probability of the next word in the sequence given the input sequence so far. In some examples, the output may be represented as a probability distribution over the vocabulary or a subset of the vocabulary. The neural network(s) is configured to receive the word embeddings and generate an output, and, in some examples, the query activity (e.g., previous natural language queries and textual responses). The output may represent a version of the model response 130. The output may include a sequence of output word probability distributions, where each output distribution represents the probability of the next word in the sequence given the input sequence so far. In some examples, the output may be represented as a probability distribution over the vocabulary or a subset of the vocabulary. The decoder is configured to receive the output and generate the model response 130. In some examples, the decoder may select the most likely instruction, sampling from a probability distribution, or using other techniques to generate coherent and well written model response 130.

In some examples, the database 102 may be stored on a server computer 160 that also includes, or is associated with an entity that also manages, the RAG system 115 (e.g., the ingestion engine 116, the context retrieval engine 118, the prompt manager 114, the SoC engine 150, the action engine 156, the query rewrite module 162, the index lifecycle manager 164, the data aggregation engine 167, the semantic ranking engine 171, the adaptive context engine 174, the SoC engine adjustor 180, etc.). In some examples, the database 102 is external to the server computer 160 that hosts the RAG system 115. In other words, in some examples, the database 102 is owned and/or managed by an entity that is different from the entity that owns and/or manages the system 100. In some examples, the database 102 may be an external data store.

Figure 8:
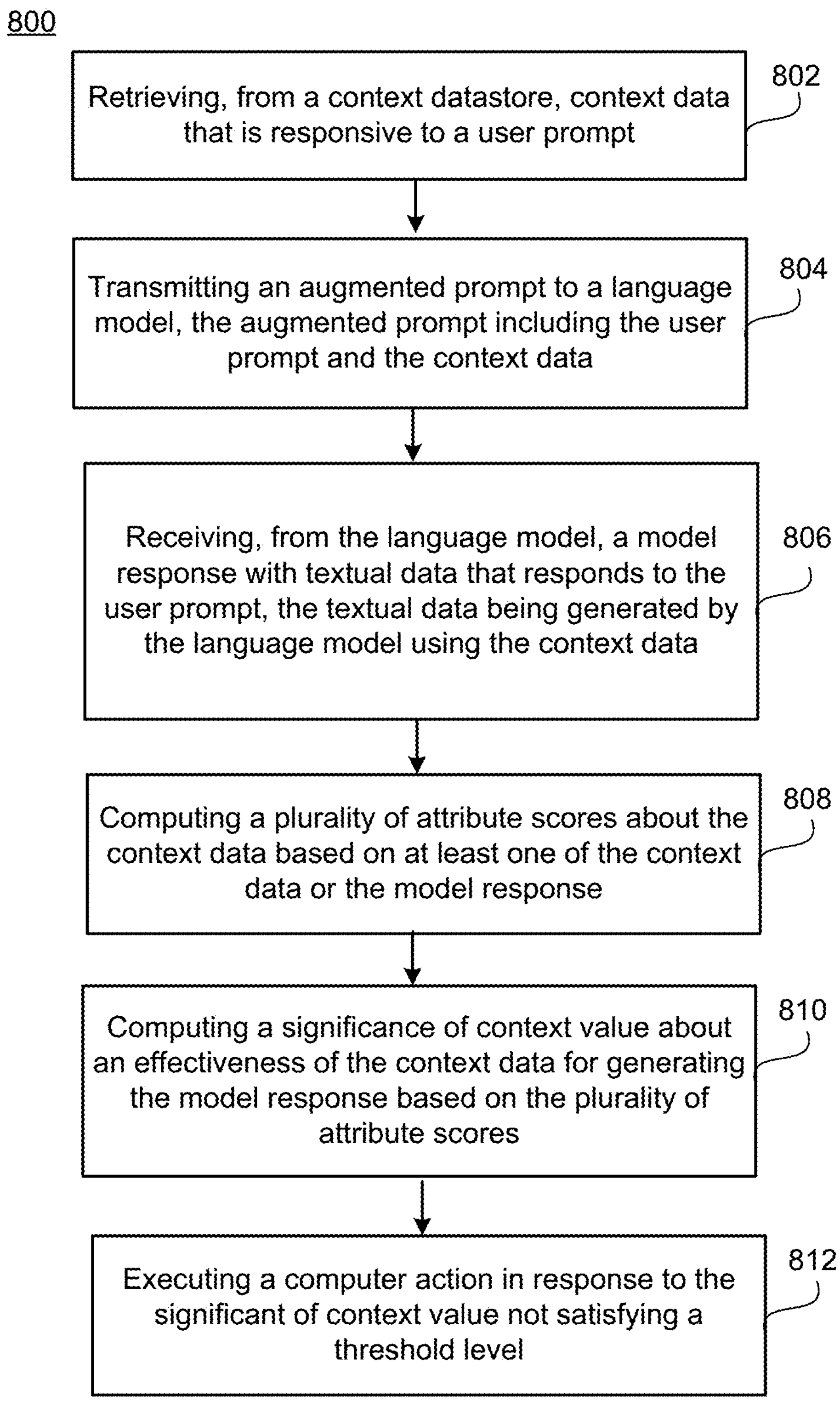
FIG. 8 illustrates a flowchart depicting example operations of generating a model response using context data and measuring an effectiveness of the context data according to an aspect.

FIG. 8 is a flowchart 800 depicting example operations of flowchart depicting example operations of generating a model response using context data and measuring an effectiveness of the context data according to an aspect. The example operations of FIG. 8 may be executed by any of the systems discussed herein. The flowchart 800 may depict operations of a computer-implemented method. Although the flowchart 800 of FIG. 8 illustrates the operations in sequential order, it will be appreciated that this is merely an example, and that additional or alternative operations may be included. Further, operations of FIG. 8 and related operations may be executed in a different order than that shown, or in a parallel or overlapping fashion.

Operation 802 includes retrieving, from a context datastore, context data that is responsive to a user prompt. Operation 804 includes transmitting an augmented prompt to a language model, the augmented prompt including the user prompt and the context data. Operation 806 includes receiving, from the language model, a model response with textual data that responds to the user prompt, the textual data being generated by the language model using the context data. Operation 808 includes computing a plurality of attribute scores about the context data based on at least one of the context data or the model response. Operation 810 includes computing a significance of context value about an effectiveness of the context data for generating the model response based on the plurality of attribute scores. Operation 812 includes executing a computer action in response to the significance of context value not satisfying a threshold level.

Clause 1. A method comprising: retrieving, from a context datastore, context data that is responsive to a user prompt; transmitting an augmented prompt to a language model, the augmented prompt including the user prompt and the context data; receiving, from the language model, a model response with textual data that responds to the user prompt, the textual data being generated by the language model using the context data; computing a plurality of attribute scores about the context data based on at least one of the context data or the model response; computing a significance of context value about an effectiveness of the context data for generating the model response based on the plurality of attribute scores; and executing a computer action in response to the significance of context value not satisfying a threshold level.

Clause 2. The method of clause 1, wherein the plurality of attribute scores include two or more of a relevance score representing a level of semantic similarity between the user prompt and the context data, a timeliness score representing a level of recentness of the context data, a continuity score represent a level of continuity of the context data, and an accuracy level representing a level of accuracy of the model response.

Clause 3. The method of clause 1, wherein computing the significance of context value includes: executing an algorithm that applies weights to the plurality of attribute scores.

Clause 4. The method of clause 3, wherein the algorithm includes a sigmoid function.

Clause 5. The method of clause 1, wherein the plurality of attribute scores include a relevance score, wherein executing the computer action includes: determining that the relevance score does not achieve a threshold level or is a lowest among the plurality of attribute scores; generating a revised query based on a template or a query domain-specific language; and retrieving the context data using the revised query.

Clause 6. The method of clause 1, wherein the context data includes search results retrieved from the context datastore, wherein the plurality of attribute scores include a relevance score, wherein executing the computer action includes: determining that the relevance score does not achieve a threshold level or is a lowest among the plurality of attribute scores; generating ranked search results by ranking the search results; and including the ranked search results in the augmented prompt.

Clause 7. The method of clause 1, wherein the plurality of attribute scores include a timeliness score, wherein executing the computer action includes: determining that the timeliness score does not achieve a threshold level or is a lowest among the plurality of attribute scores; and updating an index structure of the context datastore.

Clause 8. The method of clause 1, wherein the context data includes a first context data portion and a second context data portion, wherein the plurality of attribute scores include a continuity score, wherein executing the computer action includes: determining that the continuity score does not achieve a threshold level or is a lowest among the plurality of attribute scores; generating, by an inference model, a third context data portion based on the first context data portion and the second context data portion; and including the first context data portion, the second context data portion, and the third context data portion in the augmented prompt.

Clause 9. The method of clause 1, wherein executing the computer action includes: determining that an iteration count exceeds a threshold level, the iteration count representing a number of regenerations associated with the user prompt; and updating an algorithm that is used to compute the significance of context value.

Clause 10. The method of clause 1, wherein executing the computer action includes: retrieving feedback data provided by a user with respect to the model response; and updating an algorithm that is used to compute the significance of context value based on the feedback data.

Clause 11. An apparatus comprising: at least one processor; and a non-transitory computer-readable medium storing executable instructions that when executed by the at least one processor cause the at least one processor to execute operations, the operations comprising: retrieving, from a context datastore, context data that is responsive to a user prompt; transmitting an augmented prompt to a language model, the augmented prompt including the user prompt and the context data; receiving, from the language model, a model response with textual data that responds to the user prompt, the textual data being generated by the language model using the context data; computing a plurality of attribute scores about the context data based on at least one of the context data or the model response, the plurality of attribute scores including two or more of a relevance score, a timeliness score, a continuity score, or a accuracy score; computing a significance of context value about an effectiveness of the context data for generating the model response based on the plurality of attribute scores; and executing a computer action in response to the significance of context value not satisfying a threshold level.

Clause 12. The apparatus of clause 11, wherein the operations further comprise: executing an algorithm that applies weights to the plurality of attribute scores, the algorithm including a sigmoid function.

Clause 13. The apparatus of clause 11, wherein the operations further comprise: computing the relevance score based on a semantic similarity between the user prompt and the context data.

Clause 14. The apparatus of clause 11, wherein the operations further comprise: computing the timeliness score based on a temporal distance between a first timestamp associated with the user prompt and a second timestamp associated with the context data.

Clause 15. The apparatus of clause 11, wherein the operations further comprise: computing the continuity score, including: generating a first embedding vector representing a first portion of the context data; generating a second embedding vector representing a second portion of the context data; and computing a similarity between the first embedding vector and the second embedding vector;

Clause 16. The apparatus of clause 11, wherein the operations further comprise: computing the accuracy score based on an iteration count achieving a threshold level, the iteration count representing a number of regenerations associated with the user prompt.

Clause 17. A non-transitory computer-readable medium storing executable instructions that cause at least one processor to execute operations, the operations comprising: retrieving, from a context datastore, context data that is responsive to a user prompt; transmitting an augmented prompt to a language model, the augmented prompt including the user prompt and the context data; receiving, from the language model, a model response with textual data that responds to the user prompt, the textual data being generated by the language model using the context data; computing a plurality of attribute scores about the context data based on at least one of the context data or the model response; computing a significance of context value about an effectiveness of the context data for generating the model response based on the plurality of attribute scores; and executing a computer action in response to the significance of context value not satisfying a threshold level.

Clause 18. The non-transitory computer-readable medium of clause 17, wherein the context data includes search results, wherein the plurality of attribute scores include a relevance score, wherein the operations further comprise: determining that the relevance score does not achieve a threshold level or is a lowest among the plurality of attribute scores; generating a revised query based on a template or a query domain-specific language; or generating ranked search results by ranking the search results.

Clause 19. The non-transitory computer-readable medium of clause 17, wherein the plurality of attribute scores include a timeliness score, wherein the operations further comprise: determining that the timeliness score does not achieve a threshold level or is a lowest among the plurality of attribute scores; and updating an index structure of the context datastore. 20 The non-transitory computer-readable medium of claim 17, wherein the context data includes a first context data portion and a second context data portion, wherein the plurality of attribute scores include a continuity score, wherein the operations further comprise: determining that the continuity score does not achieve a threshold level or is a lowest among the plurality of attribute scores; generating, by an inference model, a third context data portion based on the first context data portion and the second context data portion; and including the first context data portion, the second context data portion, and the third context data portion in the augmented prompt.

Some implementations are configured to delineate and/or identify the multifarious properties (e.g., scoring attributes) that jointly constitute context (e.g., context data) in LLMs. Some implementations are configured to devise a robust, quantifiable metric (e.g., value, an SoC value 112) that measures the amalgamation of these properties, ultimately facilitating the selection of a desirable datastore solution based on the specific contextual profile required.

In achieving this, some of the concepts described herein provide a lens through which datastore solutions can be evaluated not just on their technical merits but, in some examples, on their ability to bolster an LLM's contextual understanding and response generation capabilities.

Large Language Models (LLMs) are at the forefront of providing sophisticated, contextually aware responses to a myriad of user interactions. However, powering these LLMs is not just about the computational rigors and algorithmic complexities. One of the most substantial challenges a user can face is the economic and skillset cost associated with training or fine-tuning these models. The expenditure, both in monetary terms and specialized expertise, can be formidable. While training is an aspect (e.g., a significant aspect) of enabling LLMs, the dynamism of real-world data cannot be ensnared solely by static training sessions. Users may grapple with the challenge of keeping LLMs apprised of recent, possibly proprietary data, ensuring the models resonate with the ever-evolving contexts they operate in. A mere database storing this auxiliary information may fall short of the mark. For example, data may not be a static entity, but rather state may be dynamic, e.g., oscillating between relevance and obsolescence, and its significance can be transient.

In some examples, the SoC engine 150, action engine 156, and/or related components may be implemented as a dynamic context layer (DCL). In some examples, the DCL does not function solely as a data repository. The DCL may be an agile layer dedicated to enriching LLMs with dynamic data, e.g., data that is characterized by its lifecycle attributes such as relevancy, recency, accuracy, and aging. However, the inception of such a layer may result in the technical challenge of measuring the contextual output's quality. In some examples, a user can require a methodical approach to gauge the value of the context provided by the DCL. By amalgamating various properties that signify context, one can delineate its significance. This methodology empowers enterprises (e.g., users) to frame the service level agreements (SLAs) underpinning their DCL, guiding them in making decisions (e.g., pivotal) about technology selection, ranging from the choice of datastores to middleware considerations and resiliency parameters.

Various methodologies, both academic and commercial, have surfaced over the years, attempting to augment LLMs with context. Some traditional approaches often hinge on static databases or rudimentary context-aware systems. While they might introduce an element of context, they do not account for the dynamism of data. These methodologies can suffer from several limitations. First, at least some conventional approaches largely treat data as a stagnant entity, overlooking its evolutionary nature. Secondly, some conventional approaches fail to offer a holistic approach to quantify the quality of context-recency, relevance, and/or accuracy. Lastly, some conventional approaches are not adept at seamlessly integrating with LLMs, creating a disjoint rather than a harmonious augmentation.

The systems discussed herein may not only provide context but also equip users (e.g., enterprises) with the tools to evaluate its potency, ensuring that LLMs are consistently offering data that is both relevant and timely. The concepts described herein are configured to bridge this gap, introducing a quantifiable metric to gauge the effectiveness of context and guiding users (e.g., businesses) in architecting a dynamic context layer that complements their LLMs.

In some examples, the SoC algorithm 139 can be configured to amalgamate multiple facets of data into a singular, quantifiable metric (e.g., a SoC value 112). Unlike traditional methodologies that might offer context without a structured way to evaluate its quality, in some examples, the SoC algorithm 139 can provide a multi-dimensional insight into the context's relevance, continuity, timeliness, and accuracy. Some of the technical advantages may include holistic evaluation (e.g., the SoC algorithm 139 can include a comprehensive appraisal, folding in varied attributes of data into one discernible metric), customizability (e.g., the SoC algorithm 139 can include adjustable weights and sensitivity factor, and may be tailored to cater to specific industry needs or application peculiarities), quantifiable benchmarking (e.g., the SoC algorithm 139 can include a threshold that allows for a clear demarcation, guiding users in assessing whether the context meets stipulated standards), dynamic adaptability (e.g., the SoC algorithm 139 can be designed to be malleable, adjusting to the changing contours of data significance over time to handle the evolutionary nature of data, objective context evaluation (e.g., by translating abstract notions of relevancy, continuity, timeliness, and accuracy into a framework, the SoC algorithm 139 can be configured as an objective methodology, reducing ambiguities in context assessment. In some examples, the SoC algorithm 139 can function as a transformative approach to context evaluation, empowering users to not just enrich LLMs with data but to do so with a discerning, methodical, and/or objective lens.

In some examples, for use cases where one of the factors (like timeliness in news applications) is overwhelmingly more important, the weights can be adjusted disproportionately to reflect this priority. In some examples, in scenarios where context data 108 is either absolutely critical or completely irrelevant, a steeper sigmoid function (by adjusting the k value) can be employed to create a more binary-like output. In some examples, for applications that have a defined standard of what constitutes an "acceptable" context, the threshold can be adjusted to reflect this baseline, ensuring that only data sources that meet or exceed this standard are considered significant.

In some examples, additional factors or properties can be introduced into the formula based on specific industry needs, expanding beyond the relevance score 121, the timeliness score 123, the continuity score 125, and the accuracy score 127. For instance, authenticity might be a crucial factor for journalistic applications, and this could be incorporated into the SoC algorithm 139 accordingly. In some examples, by employing the methodology in these diverse ways, organizations and/or developers can ensure that the data driving their applications and systems is not just plentiful but also contextually significant.

There are many practical scenarios that demonstrate the application of the SoC algorithm (e.g., SoC measurement methodology) in providing meaningful context to Large Language Models (LLMs). In some examples, a tech company integrates an LLM into their customer support structure. The LLM relies on data from the company's knowledge base, community forums, and recent bug reports to provide contextually relevant answers. Using the SoC algorithm 139, the LLM dynamically adjusts its responses based on the contextual significance of the data. If a user mentions a current widespread software issue and recent bug reports (with high timeliness and relevance scores) address this, the LLM may prioritize and craft responses using this information. Moreover, validated and consistent forum solutions (e.g., showing high Accuracy and Continuity) may also influence the LLM's suggestions. In some examples, users receive precise and contextually up-to-date solutions, enhancing user satisfaction and leading to efficient problem resolution.

In some examples, an academic researcher employs an LLM to aggregate and summarize relevant research papers on a particular topic. The LLM, equipped with the SoC methodology, may prioritize papers that are recent (e.g., timeliness), align with the researcher's topic of interest (e.g., relevance), and come from journals with consistent publishing schedules (e.g., continuity). It also considers the accuracy and credibility of sources, ensuring they meet academic standards (e.g., accuracy). In some examples, the researcher obtains a synthesized summary or list of articles that are highly contextually significant, ensuring that their research is built on reliable and current foundations.

In some examples, analysts use an LLM to help predict market trends based on various data sources, such as news articles, historical data, and recent economic indicators. The LLM, leveraging the SoC algorithm 139, may provide insights that prioritize recent economic indicators (e.g., timeliness), align with the specific market segment of interest (e.g., relevance), come from consistent and trusted news outlets (e.g., continuity), and are validated against verified economic models (e.g., accuracy). In some examples, analysts receive context-rich insights, aiding them in making well-informed investment decisions.

In some examples, LLMs, when guided by the SoC algorithm 139, can offer answers that are not just broad and general but specifically tuned to the current and most contextually significant data, thus greatly improving the user experience. In some examples, LLMs can be trained or fine-tuned on vast amounts of data. In some examples, the SoC algorithm 139 allows users (e.g., organizations) to prioritize which data sources are most beneficial for the LLM's contextual understanding, optimizing both costs and performance. In some examples, ensuring the LLM provides context-rich information increases user trust. Users can be confident that the model is not regurgitating stored knowledge, but actively providing the most relevant and updated information. In some examples, as the contextual significance of data changes over time, LLMs informed by the SoC methodology can dynamically adjust their responses, ensuring they remain relevant and effective in real-world scenarios.

Some implementations can include a method for evaluating context significance. Some implementations can include a method and system for quantifying the significance of context, as characterized by combining individual context factors, to enhance the functionality and efficacy of Large Language Models (LLMs) or similar systems, using the described SoC formula. Some implementations can include an application of a sigmoid function. Some implementations can include a unique utilization of a sigmoid function as a means to amalgamate and smooth the resulting value derived from individual context factors to ensure a bounded result between 0 and 1, capturing the contextual significance in a normalized fashion.

Some implementations can include implementation of weights for context factors. Some implementations can include a system and method for applying distinct weights, ($w_R$, $w_C$, $w_T$, $w_A$), to individual context factors (Relevance, Continuity, Timeliness, and Accuracy) allowing for customized prioritization based on specific use cases and requirements. Some implementations can include integration of a sensitivity parameter, k. Some implementations can include a methodology that incorporates a sensitivity parameter, k, to control the steepness of the sigmoid function, thereby enabling fine-tuning of the responsiveness of the SoC value to changes in individual context factors. Some implementations can include utilization of a threshold for midpoint adjustment. Some implementations can include the introduction and application of a threshold value within the SoC formula, allowing for the adjustment of the midpoint around which the sigmoid function operates, ensuring flexibility in emphasizing or de-emphasizing specific contextual requirements.

Some implementations can include dynamic applications for various data types. Some implementations can include the adaptability of the SoC methodology to evaluate the contextual significance across various data types and sources, ensuring its applicability across diverse domains from customer support to academic research and financial analysis. Some implementations can include software and hardware implementations. Some implementations can include a non-transitory computer-readable medium embodying a program executable by a processor to carry out the SoC methodology, alongside potential hardware-accelerated implementations for real-time context evaluation. Some implementations can include adjustability for specific use cases. Some implementations can include the inherent design of the SoC methodology that allows for modifications, variations, and refinements based on specific use cases, ensuring its versatility and broad applicability.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are remote from each other and typically interact through a communication network. The relationship of client and server arises by virtue of computer programs running on the respective computers and having a client-server relationship with each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:

in response to a user prompt, converting the user prompt to a query vector using an embedding model;

retrieving, from a context datastore, context data that is responsive to the user prompt by performing a vector search to identify a vector representation that is semantically similar to the query vector;

converting the context data from the vector representation into a textual representation using the embedding model;

transmitting an augmented prompt to a language model, the augmented prompt including the user prompt and the textual representation of the context data;

receiving, from the language model, a model response with textual data that responds to the user prompt, the textual data being generated by the language model using the context data;

computing a plurality of attribute scores about the context data based on at least one of the context data or the model response;

computing a significance of context value about an effectiveness of the context data for generating the model response based on the plurality of attribute scores; and executing a computer action in response to the significance of context value not satisfying a threshold condition.

2. The method of claim 1, wherein the plurality of attribute scores include two or more of a relevance score representing a level of semantic similarity between the user prompt and the context data, a timeliness score representing a level of recentness of the context data, a continuity score representing a level of continuity of the context data, and an accuracy level representing a level of accuracy of the model response.

3. The method of claim 1, wherein computing the significance of context value includes:

applying a sigmoid function to a weighted combination of the plurality of attribute scores, wherein applying the sigmoid function includes applying a sensitivity parameter to the sigmoid function to adjust a steepness of a curve of the sigmoid function.

4. The method of claim 1, wherein the plurality of attribute scores include a relevance score, wherein executing the computer action includes:

determining that the relevance score does not achieve a threshold level or is a lowest among the plurality of attribute scores;

generating a revised query vector based on a template having at least one placeholder variable that is populated with data at query time; and retrieving the context data using the revised query vector.

5. The method of claim 1, wherein the context data includes search results retrieved from the context datastore, wherein the plurality of attribute scores include a relevance score, wherein executing the computer action includes:

determining that the relevance score does not achieve a threshold level or is a lowest among the plurality of attribute scores;

generating ranked search results by ranking the search results based on semantic relevance to the user prompt; and generating the augmented prompt to include the ranked search results.

6. The method of claim 1, wherein the plurality of attribute scores include a timeliness score, wherein executing the computer action includes:

determining that the timeliness score does not achieve a threshold level or is a lowest among the plurality of attribute scores; and updating a database index of the context datastore to remove or deprioritize data in the database index having timestamps that are older than a time threshold.

7. The method of claim 1, wherein the context data includes a first context data portion retrieved from the context datastore and a second context data portion retrieved from the context datastore, wherein the plurality of attribute scores include a continuity score, wherein executing the computer action includes:

determining that the continuity score does not achieve a threshold level or is a lowest among the plurality of attribute scores;

generating, by an inference model, a third context data portion based on the first context data portion and the second context data portion, the third context data portion including information that bridges a gap between the first context data portion and the second context data portion; and generating the augmented prompt to include the first context data portion, the second context data portion, and the third context data portion.

8. The method of claim 1, wherein executing the computer action includes:

determining that an iteration count exceeds a threshold level, the iteration count representing a number of times a user selects a re-generate control on a user interface to regenerate the model response without submission of another user prompt; and updating an algorithm that is used to compute the significance of context value.

9. The method of claim 1, wherein executing the computer action includes:

retrieving feedback data provided by a user with respect to the model response; and updating an algorithm that is used to compute the significance of context value based on the feedback data by adjusting a weight applied to at least one of the plurality of attribute scores.

10. The method of claim 1, wherein executing the computer action includes:

determining that at least one of the plurality of attribute scores does not satisfy a threshold value;

generating a revised query vector based on a domain-specific query language having at least one domain-specific construct, the at least one domain-specific construct being used to revise a portion of the query vector; and retrieving updated context data using the revised query vector.

11. The method of claim 1, further comprising:

receiving, via a user interface, a selection of a model identifier from a list of model identifiers corresponding to a plurality of language models; and transmitting the augmented prompt to the language model corresponding to the model identifier using a connector among a plurality of connectors, wherein the connector is configured to enable communication with the language model.

12. An apparatus comprising:

at least one processor; and a non-transitory computer-readable medium storing executable instructions that when executed by the at least one processor cause the at least one processor to execute operations, the operations comprising:

in response to a user prompt, converting the user prompt to a query vector using an embedding model;

retrieving, from a context datastore, context data that is responsive to the user prompt by performing a vector search to identify a vector representation that is semantically similar to the query vector;

converting the context data from the vector representation into a textual representation using the embedding model;

transmitting an augmented prompt to a language model, the augmented prompt including the user prompt and the textual representation of the context data;

receiving, from the language model, a model response with textual data that responds to the user prompt, the textual data being generated by the language model using the context data;

computing a plurality of attribute scores about the context data based on at least one of the context data or the model response, the plurality of attribute scores including two or more of a relevance score, a timeliness score, a continuity score, or an accuracy score;

computing a significance of context value about an effectiveness of the context data for generating the model response based on the plurality of attribute scores; and executing a computer action in response to the significance of context value not satisfying a threshold condition.

13. The apparatus of claim 12, wherein the operations further comprise:

executing an algorithm that applies weights to the plurality of attribute scores, the algorithm including a sigmoid function.

14. The apparatus of claim 12, wherein the operations further comprise:

computing the relevance score based on a semantic similarity between the user prompt and the context data.

15. The apparatus of claim 12, wherein the operations further comprise:

computing the timeliness score based on a temporal distance between a first timestamp associated with the user prompt and a second timestamp associated with the context data.

16. The apparatus of claim 12, wherein the operations further comprise:

computing the continuity score, including:

generating a first embedding vector representing a first portion of the context data;

generating a second embedding vector representing a second portion of the context data; and computing a similarity between the first embedding vector and the second embedding vector.

17. The apparatus of claim 12, wherein the operations further comprise:

computing the accuracy score based on an iteration count achieving a threshold level, the iteration count representing a number of times a user selects a re-generate control on a user interface to regenerate the model response without submission of another user prompt.

18. A non-transitory computer-readable medium storing executable instructions that cause at least one processor to execute operations, the operations comprising:

in response to a user prompt, converting the user prompt to a query vector using an embedding model;

retrieving, from a context datastore, context data that is responsive to the user prompt by performing a vector search to identify a vector representation that is semantically similar to the query vector;

converting the context data from the vector representation into a textual representation using the embedding model;

transmitting an augmented prompt to a language model, the augmented prompt including the user prompt and the textual representation of the context data;

receiving, from the language model, a model response with textual data that responds to the user prompt, the textual data being generated by the language model using the context data;

computing a plurality of attribute scores about the context data based on at least one of the context data or the model response;

computing a significance of context value about an effectiveness of the context data for generating the model response based on the plurality of attribute scores; and executing a computer action in response to the significance of context value not satisfying a threshold condition.

19. The non-transitory computer-readable medium of claim 18, wherein the context data includes search results, wherein the plurality of attribute scores include a relevance score, wherein the operations further comprise:

determining that the relevance score does not achieve a threshold level or is a lowest among the plurality of attribute scores;

generating a revised query based on a template or a query domain-specific language; and generating ranked search results by ranking the search results.

20. The non-transitory computer-readable medium of claim 18, wherein the plurality of attribute scores include a timeliness score, wherein the operations further comprise:

determining that the timeliness score does not achieve a threshold level or is a lowest among the plurality of attribute scores; and updating a database index of the context datastore to remove or deprioritize data in the database index having timestamps that are older than a time threshold.

21. The non-transitory computer-readable medium of claim 18, wherein the context data includes a first context data portion retrieved from the context datastore and a second context data portion retrieved from the context datastore, wherein the plurality of attribute scores include a continuity score, wherein the operations further comprise:

determining that the continuity score does not achieve a threshold level or is a lowest among the plurality of attribute scores;

generating, by an inference model, a third context data portion based on the first context data portion and the second context data portion, the third context data portion including information that bridges a gap between the first context data portion and the second context data portion; and generating the augmented prompt to include the first context data portion, the second context data portion, and the third context data portion.

* * * * *